(12) United States Patent
Esenlik et al.

(10) Patent No.: US 10,382,753 B2
(45) Date of Patent: Aug. 13, 2019

(54) SIMPLIFIED PIPELINE FOR FILTERING

(75) Inventors: Semih Esenlik, Nazilli (TR); Matthias Narroschke, Schaafheim (DE)

(73) Assignee: SUN PATENT TRUST, New York, NY (US)

( * ) Notice: Subject to any disclaimer, the term of this patent is extended or adjusted under 35 U.S.C. 154(b) by 891 days.

(21) Appl. No.: 14/126,588

(22) PCT Filed: Jun. 20, 2012

(86) PCT No.: PCT/EP2012/002600
§ 371 (c)(1),
(2), (4) Date: Jul. 14, 2014

(87) PCT Pub. No.: WO2012/175195
PCT Pub. Date: Dec. 27, 2012

(65) Prior Publication Data
US 2014/0328413 A1 Nov. 6, 2014

Related U.S. Application Data

(60) Provisional application No. 61/498,841, filed on Jun. 20, 2011.

(51) Int. Cl.
*H04N 19/117* (2014.01)
*H04N 19/196* (2014.01)
(Continued)

(52) U.S. Cl.
CPC ......... *H04N 19/117* (2014.11); *H04N 19/167* (2014.11); *H04N 19/17* (2014.11);
(Continued)

(58) Field of Classification Search
CPC .... H04N 19/117; H04N 19/167; H04N 19/17; H04N 19/176; H04N 19/197;
(Continued)

(56) References Cited

U.S. PATENT DOCUMENTS

| 6,489,988 B1 * | 12/2002 | Hamada ................. H04N 17/06 348/180 |
| 2009/0060034 A1 * | 3/2009 | Park ..................... H04N 19/105 375/240.12 |

(Continued)

OTHER PUBLICATIONS

Ken McCann, HM3: HEVC Test Model 3 Encoder Descriprion, Mar. 23, 2011.*

(Continued)

*Primary Examiner* — Mohammed S Rahaman
*Assistant Examiner* — Jimmy S Lee
(74) *Attorney, Agent, or Firm* — Wenderoth, Lind & Ponack, L.L.P.

(57) ABSTRACT

The present invention relates to a simplified pipeline for Sample Adaptive Offset (SAO) and Adaptive Loop Filtering (ALF) in the in-loop decoding of a video encoder and a video decoder. According to the present invention, filter parameter setting regions and filtering processing windows are aligned, to reduce the required amount of memory for parameter sets necessary for delayed filtering. This is preferably achieved by a displacement of the filter parameter setting regions with respect to LCU boundaries in at least one (preferably: vertical) or both vertical and horizontal directions.

27 Claims, 49 Drawing Sheets

(51) Int. Cl.
| | |
|---|---|
| H04N 19/176 | (2014.01) |
| H04N 19/46 | (2014.01) |
| H04N 19/61 | (2014.01) |
| H04N 19/17 | (2014.01) |
| H04N 19/44 | (2014.01) |
| H04N 19/82 | (2014.01) |
| H04N 19/167 | (2014.01) |
| H04N 19/426 | (2014.01) |

(52) U.S. Cl.
CPC ......... *H04N 19/176* (2014.11); *H04N 19/197* (2014.11); *H04N 19/426* (2014.11); *H04N 19/44* (2014.11); *H04N 19/46* (2014.11); *H04N 19/61* (2014.11); *H04N 19/82* (2014.11)

(58) Field of Classification Search
CPC ...... H04N 19/426; H04N 19/44; H04N 19/46; H04N 19/61; H04N 19/82
USPC .................................................... 375/240.29
See application file for complete search history.

(56) References Cited

U.S. PATENT DOCUMENTS

| | | | | |
|---|---|---|---|---|
| 2011/0235708 A1* | 9/2011 | Kim | ..................... | H04N 19/105 375/240.12 |
| 2011/0305274 A1* | 12/2011 | Fu | ......................... | H04N 19/46 375/240.02 |
| 2012/0082244 A1* | 4/2012 | Chen | .................... | H04N 19/147 375/240.29 |

OTHER PUBLICATIONS

Ken McCann, HM3: HEVC Test Model 3 Encoder Description, Mar. 23, 2011.*

International Search Report and Written Opinion of the International Searching Authority dated Aug. 28, 2012 in corresponding International Application No. PCT/EP2012/002600.

Chih-Ming Fu et al., JCTVC-D122, "CE8 Subset3: Picture Quadtree Adaptive Offset", Joint Collaborative Team on Video Coding (JCT-VC) of ITU-T SG16 WP3 and ISO/IEC JTC1/SC29/WG11 4th Meeting: Daegu, KR, Jan. 20-28, 2011.

Chih-Ming Fu et al., JCTVC-E049, "CE13: Sample Adaptive Offset with LCU-Independent Decoding", Joint Collaborative Team on Video Coding (JCT-VC) of ITU-T SG16 WP3 and ISO/IEC JTC1/SC29/WG11 5th Meeting: Geneva, CH, Mar. 16-23, 2011.

Thomas Wiegand et al., JCTVC-D503, "WD2: Working Draft 2 of High-Efficiency Video Coding", Joint Collaborative Team on Video Coding (JCT-VC) of ITU-T SG16 WP3 and ISO/IEC JTC1/SC29/WG11 4th Meeting: Daegu, KR, Jan. 20-28, 2011, (http://wftp3.itu.int/av-arch).

Ching-Yeh Chen et al., JCTVC-E046, "CE8 Subtest 2: Adaptation between Pixel-based and Region-based Filter Selection", Joint Collaborative Team on Video Coding (JCT-VC) of ITU-T SG16 WP3 and ISO/IEC JTC1/SC29/WG11 5th Meeting: Geneva, CH, Mar. 16-23, 2011.

I. S. Chong et al., JCTVC-E323 "CE8 Subtest 2: Block based adaptive loop filter (ALF)", Joint Collaborative Team on Video Coding (JCT-VC) of ITU-T SG16 WP3 and ISO/IEC JTC1/SC29/WG11 5th Meeting: Geneva, CH, Mar. 16-23, 2011.

Benjamin Bross et al., JCTVC-I1003_d4, "High efficiency video coding (HEVC) text specification draft 7", Joint Collaborative Team on Video Coding (JCT-VC) of ITU-T SG16 WP3 and ISO/IEC JTC1/SC29/WG11 9th Meeting: Geneva, CH, Apr. 27-May 7, 2012.

McCann et al., "HEVC Test Model 3 (HM 3) Encoder Description", Mar. 29, 2011, No. JCTVC-E602, Mar. 29, 2011 (Mar. 29, 2011), XP030009013, ISSN: 0000-0003.

Semih Esenlik et al., "Line Memory Reduction for ALF Decoding", 96. MPEG Meeting; Mar. 21, 2011-Mar. 25, 2011; Geneva; (Motion Picture Expert Group or ISO/IEC JTC1/SC29/WG11), No. m19748, Mar. 17, 2011 (Mar. 17, 2011), XP030048315.

Madhukar Budagavi et al., "Chroma ALF with reduced vertical filter size", 96. MPEG Meeting; Mar. 21, 2011-Mar. 25, 2011; Geneva; (Motion Picture Expert Group or ISO/IEC JTC1/SC29/WG11), No. m19814, Mar. 17, 2011 (Mar. 17, 2011), XP030048381.

* cited by examiner

Fig. 3
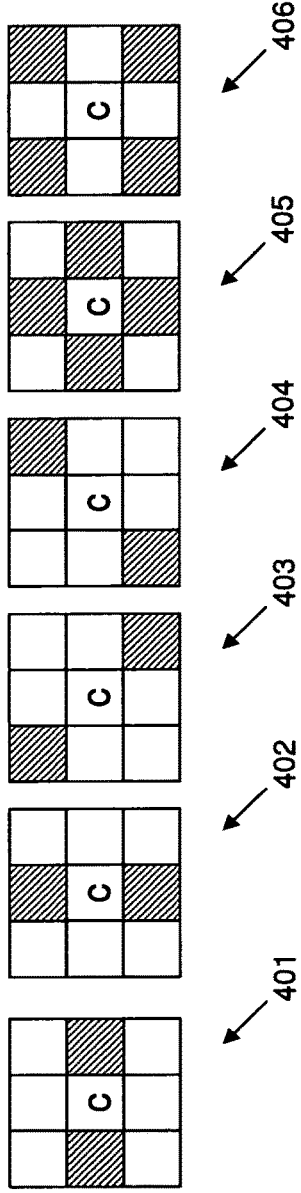
401, 402, 403, 404, 405, 406
| Category | Condition |
|---|---|
| 1 | c < 2 neighboring pixels |
| 2 | c < 1 neighbor && c == 1 neighbor |
| 3 | c > 1 neighbor && c == 1 neighbor |
| 4 | c > 2 neighbors |
| 0 | None of the above |
← 410
| Category | Condition |
|---|---|
| 1 | C < 4 neighbors |
| 2 | C < 3 neighbors && C = 4th neighbor |
| 3 | C < 3 neighbors && C > 4th neighbor |
| 4 | C > 3 neighbors && C < 4th neighbor |
| 5 | C > 3 neighbors && C = 4th neighbor |
| 6 | C > 4 neighbors |
| 0 | None of the above |
← 450

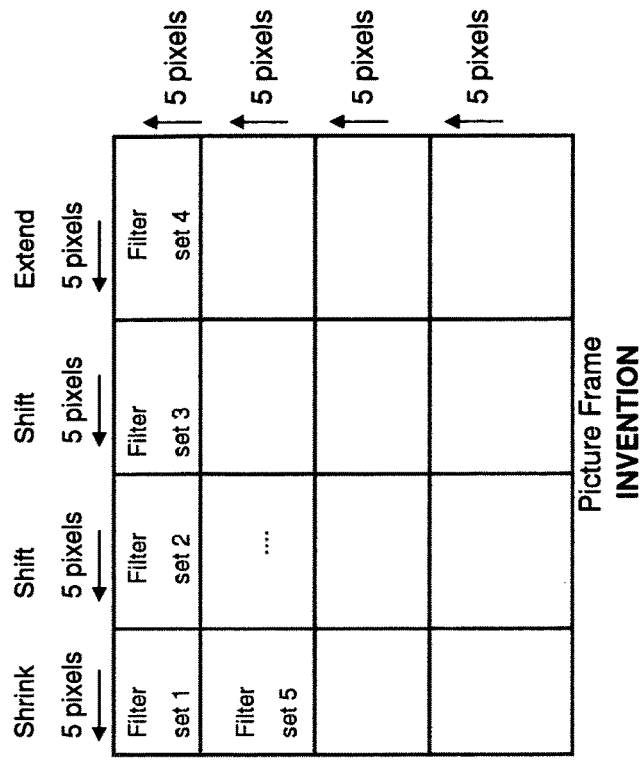
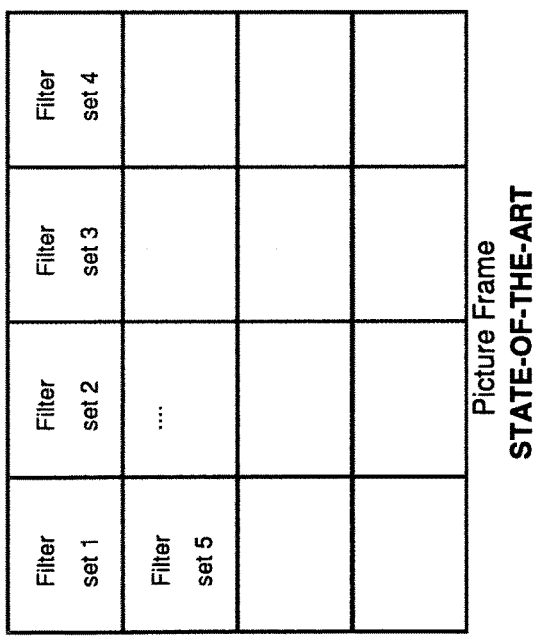
Fig. 26

Fig. 38

- Video stream (PID=0x1011, Primary video)
- Audio stream (PID=0x1100)
- Audio stream (PID=0x1101)
- Presentation graphics stream (PID=0x1200)
- Presentation graphics stream (PID=0x1201)
- Interactive graphics stream (PID=0x1400)
- Video stream (PID=0x1B00, Secondary video)
- Video stream (PID=0x1B01, Secondary video)

Fig. 49

| Corresponding standard | Driving frequency |
|---|---|
| MPEG-4 AVC | 500 MHz |
| MPEG-2 | 350 MHz |
| ... | ... |

SIMPLIFIED PIPELINE FOR FILTERING

This application is the National Stage of International Application No. PCT/EP2012/002600, filed Jun. 20, 2012, which claims the benefit of U.S. Provisional Application No. 61/498,841, filed Jun. 20, 2011.

BACKGROUND OF THE INVENTION

The present invention relates to the filtering of images. In particular, the present invention relates to pipelining for filtering of reconstructed images in a decoder and a decoding loop of an encoder.

At present, the majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups. This codec is being further developed by Joint Collaborative Team on Video Coding (JCT-VC) under a name High-Efficiency Video Coding (HEVC), aiming, in particular at improvements of efficiency regarding the high-resolution video coding.

A video signal input to an encoder is a sequence of images called frames, each frame being a two-dimensional matrix of pixels. All the above-mentioned standards based on hybrid video coding include subdividing each individual video frame into smaller blocks consisting of a plurality of pixels. The size of the blocks may vary, for instance, in accordance with the content of the image. The way of coding may be typically varied on a per block basis. The largest possible size for such a block, for instance in HEVC, is 64×64 pixels. It is then called the largest coding unit (LCU). In H.264/MPEG-4 AVC, a macroblock (usually denoting a block of 16×16 pixels) was the basic image element, for which the encoding is performed, with a possibility to further divide it in smaller subblocks to which some of the coding/decoding steps were applied.

Typically, the encoding steps of a hybrid video coding include a spatial and/or a temporal prediction. Accordingly, each block to be encoded is first predicted using either the blocks in its spatial neighborhood or blocks from its temporal neighborhood, i.e. from previously encoded video frames. A block of differences between the block to be encoded and its prediction, also called block of prediction residuals, is then calculated. Another encoding step is a transformation of a block of residuals from the spatial (pixel) domain into a frequency domain. The transformation aims at reducing the correlation of the input block. Further encoding step is quantization of the transform coefficients. In this step the actual lossy (irreversible) compression takes place. Usually, the compressed transform coefficient values are further compacted (losslessly compressed) by means of an entropy coding. In addition, side information necessary for reconstruction of the encoded video signal is encoded and provided together with the encoded video signal. This is for example information about the spatial and/or temporal prediction, amount of quantization, etc.

FIG. 1 is an example of a typical H.264/MPEG-4 AVC and/or HEVC video encoder 100. A subtractor 105 first determines differences e between a current block to be encoded of an input video image (input signal s) and a corresponding prediction block $\hat{s}$, which is used as a prediction of the current block to be encoded. The prediction signal may be obtained by a temporal or by a spatial prediction 180. The type of prediction can be varied on a per frame basis or on a per block basis. Blocks and/or frames predicted using temporal prediction are called "inter"-encoded and blocks and/or frames predicted using spatial prediction are called "intra"-encoded. Prediction signal using temporal prediction is derived from the previously encoded images, which are stored in a memory. The prediction signal using spatial prediction is derived from the values of boundary pixels in the neighboring blocks, which have been previously encoded, decoded, and stored in the memory. The difference e between the input signal and the prediction signal, denoted prediction error or residual, is transformed 110 resulting in coefficients, which are quantized 120. Entropy encoder 190 is then applied to the quantized coefficients in order to further reduce the amount of data to be stored and/or transmitted in a lossless way. This is mainly achieved by applying a code with code words of variable length wherein the length of a code word is chosen based on the probability of its occurrence.

Within the video encoder 100, a decoding unit is incorporated for obtaining a decoded (reconstructed) video signal s'. In compliance with the encoding steps, the decoding steps include dequantization and inverse transformation 130. The so obtained prediction error signal e' differs from the original prediction error signal due to the quantization error, called also quantization noise. A reconstructed image signal s' is then obtained by adding 140 the decoded prediction error signal e' to the prediction signal $\hat{s}$. In order to maintain the compatibility between the encoder side and the decoder side, the prediction signal $\hat{s}$ is obtained based on the encoded and subsequently decoded video signal which is known at both sides the encoder and the decoder.

Due to the quantization, quantization noise is superposed to the reconstructed video signal. Due to the block-wise coding, the superposed noise often has blocking characteristics, which result, in particular for strong quantization, in visible block boundaries in the decoded image. Such blocking artifacts have a negative effect upon human visual perception. In order to reduce these artifacts, a deblocking filter 150 is applied to every reconstructed image block. The deblocking filter is applied to the reconstructed signal s'. For instance, the deblocking filter of H.264/MPEG-4 AVC has the capability of local adaptation. In the case of a high degree of blocking noise, a strong (narrow-band) low pass filter is applied, whereas for a low degree of blocking noise, a weaker (broad-band) low pass filter is applied. The strength of the low pass filter is determined by the prediction signal $\hat{s}$ and by the quantized prediction error signal e'. Deblocking filter generally smoothes the block edges leading to an improved subjective quality of the decoded images. Moreover, since the filtered part of an image is used for the motion compensated prediction of further images, the filtering also reduces the prediction errors, and thus enables improvement of coding efficiency.

After a deblocking filter, a sample adaptive offset 155 and/or adaptive loop filter 160 may be applied to the image including the already deblocked signal s". Whereas the deblocking filter improves the subjective quality, Sample Adaptive Offset (SAO) and ALF aim at improving the pixel-wise fidelity ("objective" quality). In particular, SAO adds an offset in accordance with the immediate neighborhood of a pixel. The Adaptive Loop Filter (ALF) is used to compensate image distortion caused by the compression. Typically, the adaptive loop filter is a Wiener filter with filter coefficients determined such that the mean square error (MSE) between the reconstructed s' and source images s is minimized. The coefficients of ALF may be calculated and transmitted on a frame basis. ALF can be applied to the entire frame (image of the video sequence) or to local areas (blocks). An additional side information indicating which areas are to be filtered may be transmitted (block-based, frame-based or quadtree-based).

In order to be decoded, inter-encoded blocks require also storing the previously encoded and subsequently decoded portions of image(s) in the reference frame buffer 170. An inter-encoded block is predicted 180 by employing motion compensated prediction. First, a best-matching block is found for the current block within the previously encoded and decoded video frames by a motion estimator. The best-matching block then becomes a prediction signal and the relative displacement (motion) between the current block and its best match is then signalized as motion data in the form of three-dimensional motion vectors within the side information provided together with the encoded video data. The three dimensions consist of two spatial dimensions and one temporal dimension. In order to optimize the prediction accuracy, motion vectors may be determined with a spatial sub-pixel resolution e.g. half pixel or quarter pixel resolution. A motion vector with spatial sub-pixel resolution may point to a spatial position within an already decoded frame where no real pixel value is available, i.e. a sub-pixel position. Hence, spatial interpolation of such pixel values is needed in order to perform motion compensated prediction. This may be achieved by an interpolation filter (in FIG. 1 integrated within Prediction block 180).

For both, the intra- and the inter-encoding modes, the differences e between the current input signal and the prediction signal are transformed 110 and quantized 120, resulting in the quantized coefficients. Generally, an orthogonal transformation such as a two-dimensional discrete cosine transformation (DCT) or an integer version thereof is employed since it reduces the correlation of the natural video images efficiently. After the transformation, lower frequency components are usually more important for image quality then high frequency components so that more bits can be spent for coding the low frequency components than the high frequency components. In the entropy coder, the two-dimensional matrix of quantized coefficients is converted into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the left upper part of the two-dimensional matrix of coefficients, corresponding to the lower frequencies, the zig-zag scanning results in an array where usually the last values are zero. This allows for efficient encoding using run-length codes as a part of/before the actual entropy coding.

The H.264/MPEG-4 H.264/MPEG-4 AVC as well as HEVC includes two functional layers, a Video Coding Layer (VCL) and a Network Abstraction Layer (NAL). The VCL provides the encoding functionality as briefly described above. The NAL encapsulates information elements into standardized units called NAL units according to their further application such as transmission over a channel or storing in storage. The information elements are, for instance, the encoded prediction error signal or other information necessary for the decoding of the video signal such as type of prediction, quantization parameter, motion vectors, etc. There are VCL NAL units containing the compressed video data and the related information, as well as non-VCL units encapsulating additional data such as parameter set relating to an entire video sequence, or a Supplemental Enhancement Information (SEI) providing additional information that can be used to improve the decoding performance.

FIG. 2 illustrates an example decoder 200 according to the H.264/MPEG-4 AVC or HEVC video coding standard. The encoded video signal (input signal to the decoder) first passes to entropy decoder 290, which decodes the quantized coefficients, the information elements necessary for decoding such as motion data, mode of prediction etc. The quantized coefficients are inversely scanned in order to obtain a two-dimensional matrix, which is then fed to inverse quantization and inverse transformation 230. After inverse quantization and inverse transformation 230, a decoded (quantized) prediction error signal e' is obtained, which corresponds to the differences obtained by subtracting the prediction signal from the signal input to the encoder in the case no quantization noise is introduced and no error occurred.

The prediction signal is obtained from either a temporal or a spatial prediction 280. The decoded information elements usually further include the information necessary for the prediction such as prediction type in the case of intra-prediction and motion data in the case of motion compensated prediction. The quantized prediction error signal in the spatial domain is then added with an adder 240 to the prediction signal obtained either from the motion compensated prediction or intra-frame prediction 280. The reconstructed image s' may be passed through a deblocking filter 250, sample adaptive offset processing 255, and an adaptive loop filter 260 and the resulting decoded signal is stored in the memory 270 to be applied for temporal or spatial prediction of the following blocks/images.

The present invention particularly relates to in-loop filtering processing. State of the art hybrid video coders such as those illustrated in FIG. 1 and decoders such as those illustrated in FIG. 2, apply in-loop de-blocking filter (DF), Sample Adaptive Offset (SAO) and Adaptive Loop Filter (ALF) processing stages before the reconstructed frame is displayed on the screen or stored at the reference frame buffer. In such video coders/encoders, the filtering regions, i.e. the regions of an image, for which a common set of filter parameters is determined and set, are aligned with the boundaries of Largest Coding Units (LCU).

The hardware implementations usually use the pipelining design concept as the backbone. The pipeline is defined as a set of fixed operations that are executed one after another, wherein the output of the operation being the input of another. Since the pipeline is the backbone of the implementation, simplifications in the pipeline are considered very desirable.

The hardware implementation of the decoder and encoder usually employs on LCU-based processing, which means that every time a single largest coding unit (LCU) or a region comprising a plurality of adjacent LCUs is processed. An alternative hardware implementation, which will however not be further discussed in the framework of the present invention, is frame based implementation, which is a restrictive implementation since it requires a large amount of on-chip memory to be utilized.

In the simplest case of processing on a single LCU basis, during the processing of an LCU, the neighboring LCUs on the right and the bottom are not yet available, since their processing term has not yet come. Therefore, the filtering operations of SAO and ALF require special attention at the LCU borders, where the required samples are not yet available.

Thus, state of the art codec designs utilize a set of consecutive filtering operations to be performed one after the other, in a predefined filtering region (a single LCU or a plurality of adjacent LCUs). However, the following problem occurs:

Since the neighboring filtering regions are not available during the processing of a current filtering region, some of the samples at the borders of the filtering region cannot be processed by the filters right away. Instead, filtering operations at the filtering region boundaries are delayed and are performed together with the following filtering region in the decoding order. As a result, the filtering operation during the coding or decoding of a filtering region requires four different sets of filters, one filter set corresponding to a current filtering region, and three filter sets corresponding to the top, left and top-left neighbor filtering region (for delayed filtering). Therefore, the decoding or encoding pipeline needs to be designed to perform the filtering operation in four different regions with four different filters.

SUMMARY OF THE INVENTION

The present invention aims to provide an improved scheme of in-loop filtering that minimizes the necessary amount of filter sets per filtering region, thereby simplifying the pipeline.

This is achieved by the features of the independent claims.

According to a first aspect of the present invention, a method for processing an image signal including image data for an image that is composed of pixels and subdivided into a plurality of non-overlapping regions is provided. The processing includes at least one stage, said processing stage being Sample Adaptive Offset or Adaptive Loop Filtering. The message includes, for said processing stage, the steps of setting, for each of said regions, a set of processing parameters, and completely performing the processing of the stage within each of said regions based on the set of processing parameters for the respective region, before starting the processing of said stage for a next one of said regions.

According to a second aspect of the present invention, an apparatus for processing an image signal including image data for an image that is composed of pixels and subdivided into a plurality of non-overlapping regions is provided. The processing includes at least one stage, said processing stage being Sample Adaptive Offset or Adaptive Loop Filtering. The apparatus includes means for setting, for each of said regions, a set of processing parameters for said processing stage, and means for completely performing the processing of the stage within each of said regions based on the set of processing parameters for the respective region, before starting the processing of said stage for a next one of said regions.

It is the particular approach of the present invention to define a filtering region for which a particular set of filter parameters is set, in such a manner that the SAO and/or ALF filtering can be completed within said filtering region, before the filtering processing proceeds to the next region. Thereby, the need for retaining filter parameter sets in memory for delayed filtering is avoided and the pipeline implementation is simplified. Preferably, this is achieved by a pixel-wise shift of the boundaries of the filtering regions as compared to the conventional approach, wherein said boundaries are aligned with LCU boundaries.

The method according to the present invention may include the stage of Sample Adaptive Offset, the stage of Adaptive Loop Filtering, or both of these stages. For the stage of Sample Adaptive Offset, the step of setting the processing parameters may include setting, for each region, a pixel classification rule. For the stage of Adaptive Loop Filtering, the step of setting the processing parameters may include choosing, for each region, a particular one out of a plurality of filters.

In case of a method including both the stages of Sample Adaptive Offset and Adaptive Loop Filtering, all method steps of the present invention are preferably applied to both said stages, and the subdivision of the image into non-overlapping regions may be the same for both the stages of Sample Adaptive Offset and Adaptive Loop Filtering, or may be different for each of the stages of Sample Adaptive Offset and Adaptive Loop Filtering.

Processing according to the present invention may further include a stage of de-blocking, to be performed before said stages of Sample Adaptive Offset and/or Adaptive Loop Filtering. Thereby, the determination of the regions for subdividing the image area for the SAO/ALF stages is determined by the availability for de-blocked pixel values output by the preceding step of de-blocking.

Preferably, the subdivision of the image into a plurality of regions (filtering regions) is provided in such a manner that that the region boundaries (with the exception of the outer boundaries of the image) are shifted from coding unit boundaries in at least one of the directions parallel to the coding unit boundaries (preferably: vertical) by a predetermined number of pixels. Also preferably, the region boundaries are shifted in both directions parallel to the coding unit boundaries, i.e. vertical and horizontal. More preferably, said coding unit boundaries are the boundaries of Largest Coding Units (LCUs).

According to a preferred embodiment, the number of pixels defining the magnitude of the shift (displacement) is predefined according to a codec scheme. Alternatively preferably, said number of pixels is transmitted in the bit stream including the image signal. Hence, either a fixed shift is applied, or the magnitude of the displacement may be variably determined during encoding, encoded in the bit stream and extracted from the bit stream during decoding so as to be applied in the filtering of the decoding loop.

Preferably, the number of pixels defining the magnitude of the shift is set in such a manner that the processing of the processing stage does not require pixels not yet processed by a previous processing stage. Thereby, the complete processing of the filtering stage within the said filtering region is possible, since all necessary pixels are available. In particular, said previous processing stage may be the processing stage of de-blocking. Also, in a method or apparatus according to the present invention including both ALF and SAO stages, the respective previous processing stage may be one of those stages to be performed first, for instance SAO in the case of FIG. 1 or 2.

According to a further aspect of the present invention, a method for encoding an image including a plurality of pixels is provided. The method comprises the step of compressing and reconstructing the image data of the image. The method further comprises the step of applying all steps according to the first aspect of the present invention to an image signal including the reconstructed image data.

According to another aspect of the present invention, a method for decoding a coded image including a plurality of pixels is provided. The method comprises the step of reconstructing the image data of the image. The method further comprises the step of applying all steps according to the first aspect of the present invention to an image signal including the reconstructed image data.

According to yet another aspect of the present invention, a computer program product comprising a computer readable medium having a computer readable program code embodied thereon is provided. The program code is adapted to carry out a method according to the first or any of the previously mentioned aspects of the present invention.

In accordance with another aspect of the present invention, an apparatus for encoding an image including a plurality of pixels is provided. The apparatus comprises an encoder with a decoder for compressing and reconstructing the image data of the image and an apparatus according to the second aspect of the present invention for processing an image signal including the reconstructed image data.

According to yet another aspect of the present invention, an apparatus for decoding an image including a plurality of pixels is provided. The apparatus comprises a decoder for reconstructing the image data of the image and an apparatus according to the second aspect of the present invention for processing an image signal including the reconstructed image data.

BRIEF DESCRIPTION OF THE DRAWINGS

The accompanying drawings are incorporated into and form a part of the specification to illustrate several embodiments of the present invention. These drawings, together with the description, serve to explain the principles of the invention. The drawings are only for the purpose of illustrating preferred and alternative examples of how the invention can be made and used, and are not to be construed as limiting the invention to the illustrated and described embodiments only. Further features and advantages will become apparent from the following and more particular description of the various embodiments of the invention, as illustrated in the accompanying drawings, in which like reference numbers refer to like elements and wherein:

FIG. 3 is a schematic drawing illustrating the categorization of pixels for Sample Adaptive Offset filtering according to JCTVC-D122;

FIG. 26 illustrates application of a filter grid displacement according to a third exemplary embodiment of the present invention, in comparison with the prior art;

FIG. 38 illustrates a structure of multiplexed data;

FIG. 49 shows an example of a look-up table in which video data standards are associated with driving frequencies;

DETAILED DESCRIPTION OF THE INVENTION

The problem underlying the present invention is based on the observation that the conventional subdivision of an image area (frame) into filtering regions requires a plurality of filter parameter sets to be kept in memory for delayed filtering. Since line memory is expensive, it is desired to decrease memory cost by minimizing the necessary amount of filter parameter sets to be retained in memory.

This is achieved in the present invention by a change in the definition of the filtering regions (i.e. the regions within which the sets of filtering parameters are fixed). Namely, the filtering regions according to the present invention are no longer aligned with LCU boundaries, but they are displaced in at least one of the horizontal and vertical directions, to match the input region of the pipeline for filtering. More specifically, the filtering grids of the SAO and ALF filters are displaced in the horizontal and/or vertical direction to achieve uniformity in the filtering operation in the LCU based processing procedure. As a result, during the coding or decoding of an LCU for each of the filtering stages only a single filter parameter set is required by the pipeline, which is applied on a whole processing region of the filtering (also called a "filtering window").

In the following, some further details of Sample Adaptive Offset processing are explained as background information for a better understanding of the present invention.

Sample Adaptive Offset divides an image frame into non-overlapping regions first, wherein the smallest region is an LCU. Hence, SAO employs non-overlapping regions comprising a single LCU or a plurality of LCUs.

After the decision of partitioning into regions, a pixel classification rule is selected for each region, i.e. a single classification rule per region. Details of the respective processing will be explained below with reference to FIG. 3.

Finally, offset values are calculated for each category of the pixel classification rule. Therefore, there is a different SAO parameter set corresponding to each LCU (more generally: a region comprised of one or plural LCUs), where the SAO parameter set consists of:

a) a pixel classification method (6 Edge offset and 2 Band offset classification methods in total).

b) offset values corresponding to each category of the pixel classification method.

The SAO parameter set is used to process one of the non-overlapping regions (i.e. an LCU or a region comprised of plural LCUs).

Figure 4:
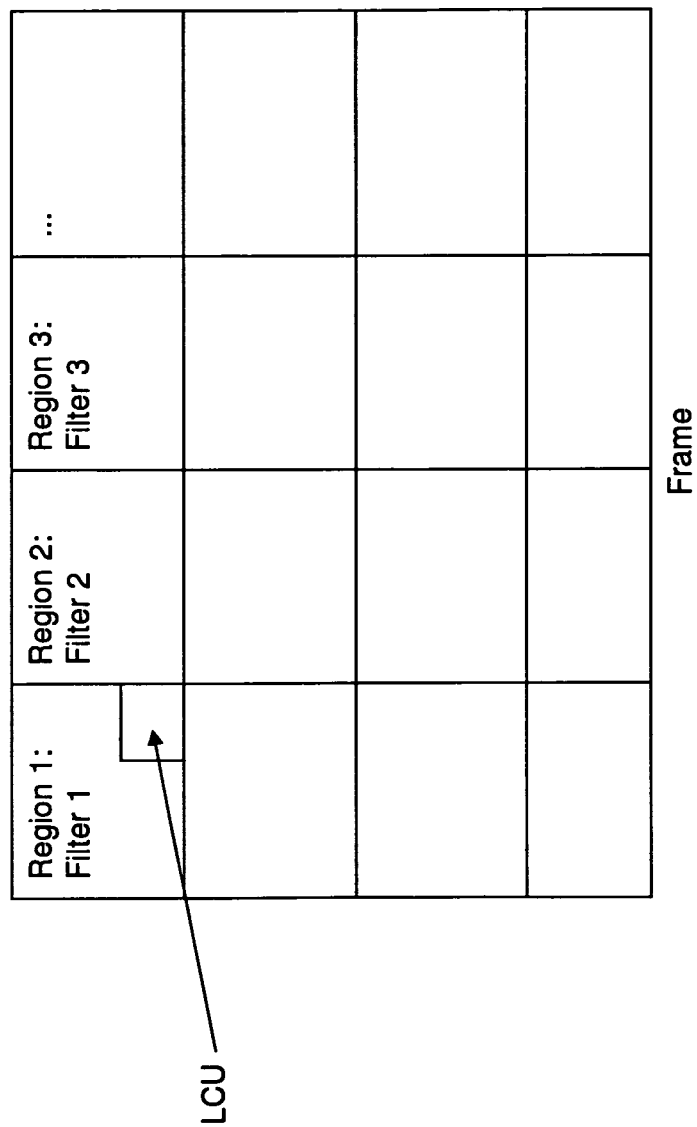
FIG. 4 is a general scheme illustrating region based filter adaptation for Adaptive Loop Filtering (ALF)

FIG. 3 illustrates an example of a Sample Adaptive Offset (SAO) processing according to the JTC-VC document JCTVC-D122, being an input to the 4th meeting in Daegu, KR, 20-28 Jan. 2011 and also according to the JTC-VC document JCTVC-E049 being an input to the 5th meeting in Geneva, 16-23 Mar. 2011. In general, sample adaptive offset may be seen as a kind of filtering of zero-th order. One of adaptive offset methods is called edge offset (EO). It classifies all pixels of a partition or an image area into multiple categories by comparing them with neighboring pixels and compensates the average offset according to each category. The basic concept of EO is to categorize a pixel into a category out of different categories according to their immediate neighborhood and to apply to the pixel a category-dependent offset accordingly. In particular, FIG. 4 shows six different example patterns 401, 402, 403, 404, 405, and 406 corresponding to a pixel "c" and pixels in its neighborhood, which are employed for categorization. Four of the patterns, namely 401 to 404, are one-dimensional patterns and two of them, namely 405 and 406 are two dimensional patterns. Shaded squares in the patterns illustrate those samples in the neighborhood of pixel "c", which are considered when categorizing pixel "c". Tables 410 and 450 show examples of how such categorization may be performed. The example originating from Table 410 shows five categories to which pixel "c" may belong to when considering one of the one-dimensional patterns (masks) 401 to 404, in particular when considering the samples in the shaded (in FIG. 3) positions relative to sample "c". For instance, pixel "c" belongs to category 1 when it's pixel value is smaller than both neighboring pixels of a one-dimensional pattern such as one of 401 to 404. Table 450 shows rules for categorizing pixel "c" according to a two-dimensional pattern such as 405 or 406. These example patterns take four samples neighboring to "c" into account. After having determined a pattern per region, each pixel in a region is categorized into a number of categories (number of categories depending on the selected pixel classification pattern) and an offset value is calculated for each category. The offset value may be the average difference between original and decoded samples. Therefore it may act to correct discrepancy between the original and decoded samples. The determined offset may then be signaled per category within the bit stream.

If an image signal is processed by sample adaptive offset filtering, the subsequent processing step may be sample adaptive loop filtering.

A general description of ALF is provided in document JCTVC-503_R1.doc, in particular, section 8.6.2—"Adaptive loop filter process". The document is available under the web page http://wftp3.itu.int/av-arch/jctvc-site/2011_01_D_Daegu/.

ALF has two modes of operation: region based filter adaptation and block based filter adaptation. For the coding of a frame, one of the two modes can be used, i.e. ALF mode operation decision is taken per frame.

Region based filter adaptation of ALF is described in document JCTVC-E046 "CE8 subtest 2: Adaptation between pixel-based and region-based filter selection", Geneva, March 2011. Block based filter adaptation of ALF is described in document JCTVC-E323, "CE8 subtest 2: Block based adaptive loop filter (ALF)", Geneva, March 2011. The present invention, if applied to ALF, is generally based on region based filter adaptation. In the following, as a background for a better understanding of the invention, some additional information will also be illustrated for block based filter adaptation of ALF.

FIG. 4 illustrates the general schematic of region based filter adaptation of ALF. As can be seen from FIG. 4, a frame is divided into 16 substantially equal regions and a different filter is designed for each region.

As can be further seen from the figure, the regions are aligned with the LCU boundaries. This means that the region boundaries cannot intersect any LCU boundary, and the smallest possible region size is equal to the LCU size. In other words, a region comprises a single one or a plurality of LCUs. As can be seen from the figure, FIG. 4 provides an example wherein a region is comprised of plural LCUs.

Figure 5:
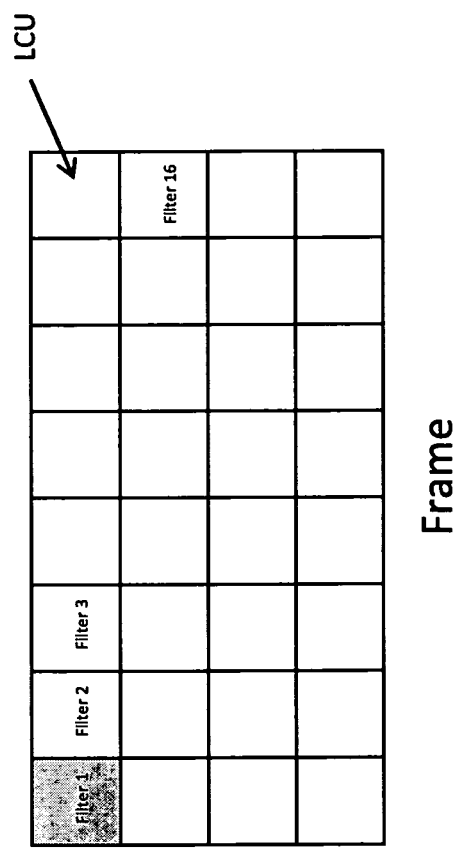
FIG. 5 is another scheme illustrating subdivision of an image frame into regions for ALF.

In FIG. 5, a similar example is shown, wherein a filter is set for each LCU for ALF operation, i.e., wherein a region corresponds to a (single) LCU. Decoding of the picture frame is performed LCU by LCU, as will be explained below. The encoder decides between region based adaptation and block based adaptation and determines the filter coefficients. The filter coefficients are coded in the bit stream and transmitted to the decoder side.

Figure 6:
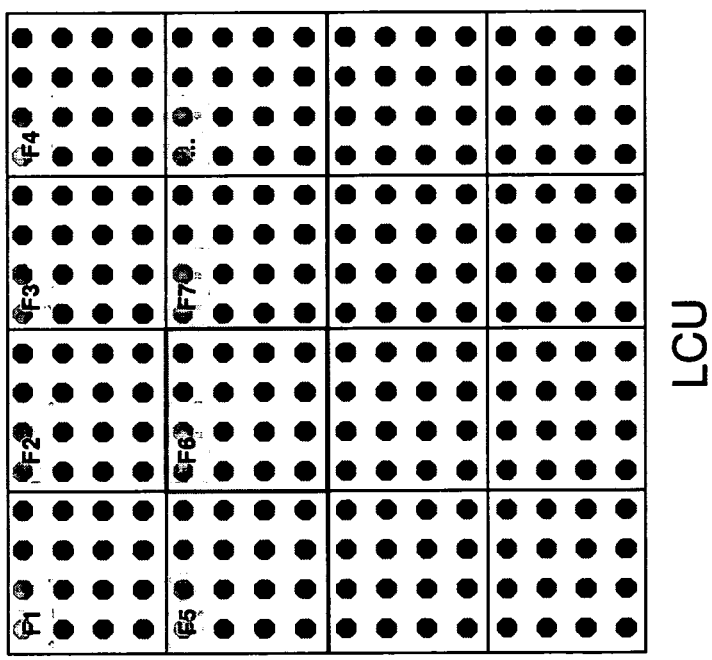
FIG. 6 provides an illustration of block based filter adaptation of ALF according to JCTVC-E323.

FIG. 6 illustrates the ALF implementation according to the above mentioned document JCTVC-E323. For ALF processing, each LCU in a frame is divided into 4×4 pixel blocks. For each block, a different filter can be chosen from the set of available filters. In the figure, a 16×16 LCU is considered, which is further divided into 16 sub-blocks. Theoretically, a different ALF filter can be used in each block. After the filter selection, the whole LCU is filtered using the selected filters in the respective positions.

Figure 7:
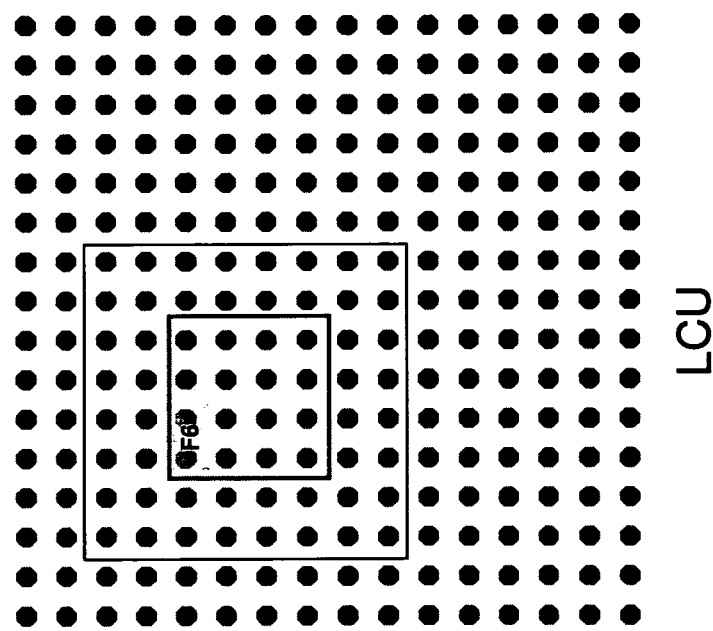
FIG. 7 provides further details of the block based filter adaptation of ALF illustrated in FIG. 6.
Figure 9:
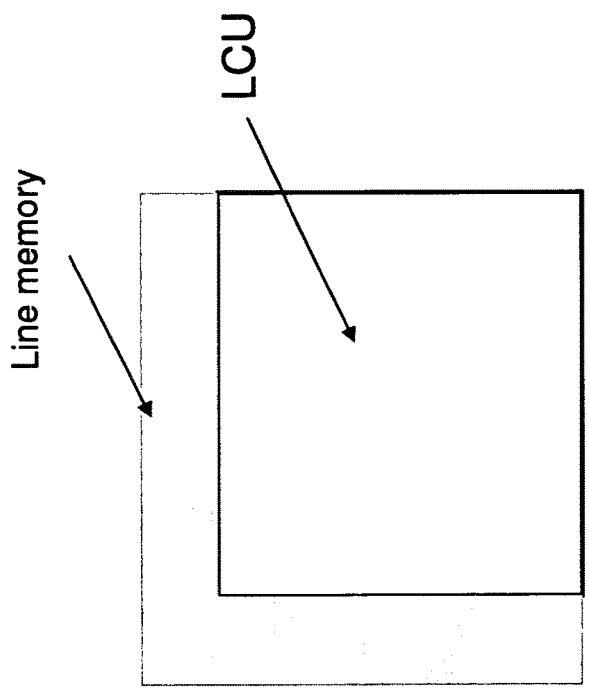
FIG. 9 provides an illustration of a second step of state of the art filtering of an LCU with consecutive filters.

Further details of block based filter adaptation of ALF, according to JCTVC-E323, are illustrated in FIG. 7. In the drawing of FIG. 7, a single one of the 4×4 sub-blocks, labeled F6 is considered. In the drawing, F6 represents the index of the filter that is selected to be used in the highlighted 4×4 sub-block. The highlighted sub-block (4×4 square block) represents the region where the selected filter (F6) is valid. As can be seen from a comparison between FIG. 7 and FIG. 6, the highlighted region (labeled F6) is one of the sub-blocks that are shown in FIG. 6.

According to JCTVC-E323, the filter selection requires all of the pixels within the surrounding 8×8 block. The decision of which filter to be used in the 4×4 sub-block is a function of all the pixel values inside the surrounding 8×8 square block (also called "the region of computation"). Therefore, the 8×8 block symmetrically surrounding the 4×4 block "F6" has also been highlighted in the drawing of FIG. 7.

To decide on the ALF filter to be used, all the pixels inside the 8×8 square block in the figure must have already been processed by SAO (and hence, also by the deblocking filter). In other words, all 64 pixels within the 8×8 block have to be processed by SAO (and deblocked) in order to decide the filter to by used in the highlighted 4×4 block.

The size of the surrounding block is not restricted to 8×8, as in JCTVC-E323, but it can be smaller or larger. The size of the sub-block is also not restricted to 4×4, which is given herein by way of example only.

The following FIGS. 8 to 12 illustrate the filtering processing of an LCU with consecutive filters in a step wise manner. For simplicity, in the present and in the following figures, a single LCU is assumed to be a processing region. As indicated above, an extension to a processing region comprising a plurality of LCUs (as illustrated, for instance, in FIG. 4) is straightforward.

Figure 8:
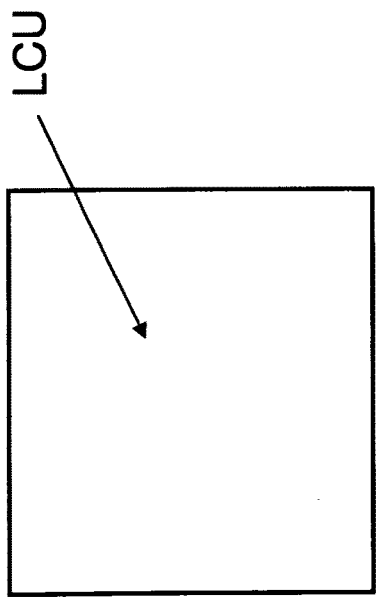
FIG. 8 provides an illustration of a first step of state of the art filtering of an LCU with consecutive filters.

In a first step (step 1), the LCU is entropy decoded and inverse transformed. FIG. 8 shows the signal S' of FIGS. 1 and 2.

In subsequent step 2 (FIG. 9), samples in the line memory are placed at the borders of the LCU in order to extend it. The line memory includes samples for which the filtering operations were delayed (since these samples were not available from output of preceding stages before).

In the following step 3 (FIGS. 10 and 11), deblocking is applied except for the bottom and the right border of the LCU.

The details of the deblocking filter application procedure may vary. In the current example, the deblocking filter from H.264/MPEG-4 part 10 is considered.

Figure 11:
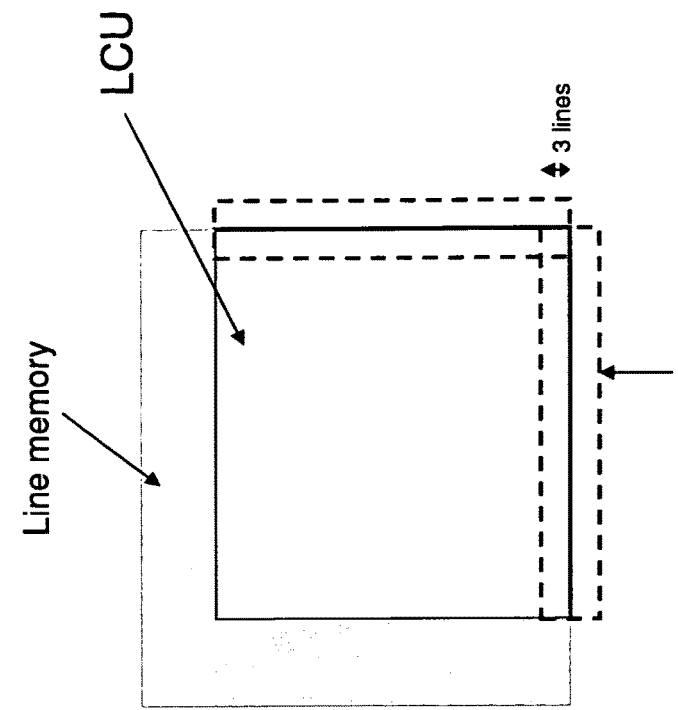
FIG. 11 provides further details of the third filtering step illustrated in FIG. 10.
Figure 10:
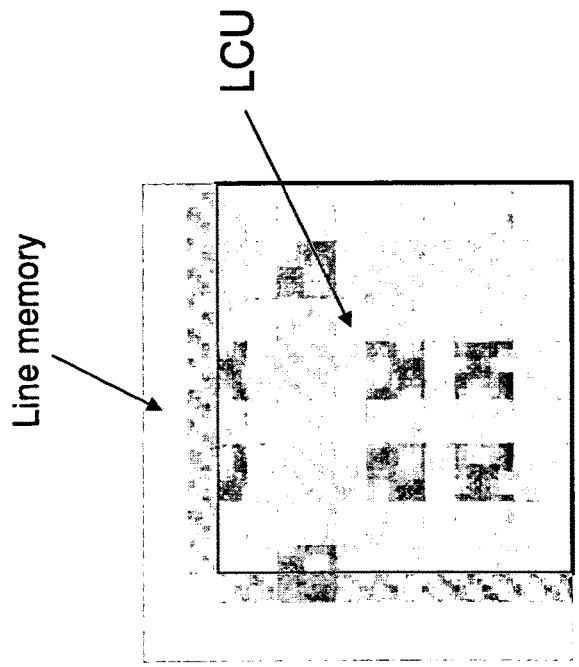
FIG. 10 provides an illustration of a third step of state of the art filtering of an LCU with consecutive filters.

More particularly, as illustrated in FIG. 11, in the deblocking stage three lines at the right LCU border and three lines at the bottom LCU border cannot be processed. This is because the deblocking at the LCU border requires the bottom and the right neighbor LCUs to be present. However, at the respective instance of time, the right and bottom LCU neighbors are not yet available. Therefore, in this processing instance, pixels inside the dashed rectangles cannot be processed by the deblocking filter.

Figure 12:
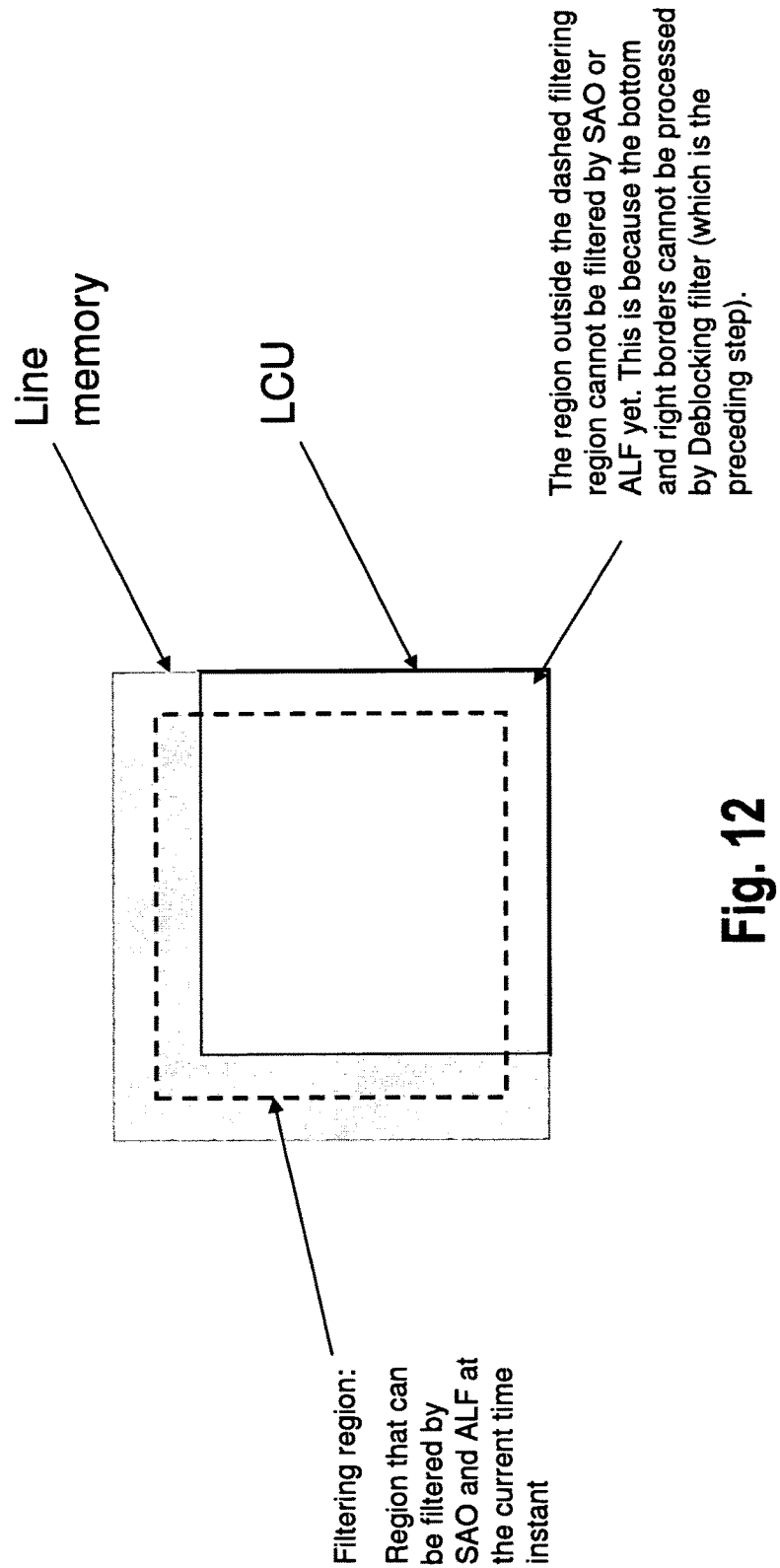
FIG. 12 provides an illustration of a fourth step of state of the art filtering of an LCU with consecutive filters.

The following filtering steps (SAO and ALF) are summarized in step 4 and illustrated in FIG. 12. The stages of SAO and ALF are performed in the region inside the dashed rectangle, which will, in the following, also be called "filtering window". The filtering window represents the region that can be filtered by SAO and ALF at the current instance of time. To the contrary, the region of the LCU located outside the filtering window (i.e. outside the dashed rectangle of FIG. 12) cannot be filtered by SAO or ALF yet, since the bottom and right borders cannot be processed by the deblocking filter (which is the preceding step). As a consequence, the filtering window is not aligned with LCU borders, as can be seen from FIG. 12.

Figure 13:
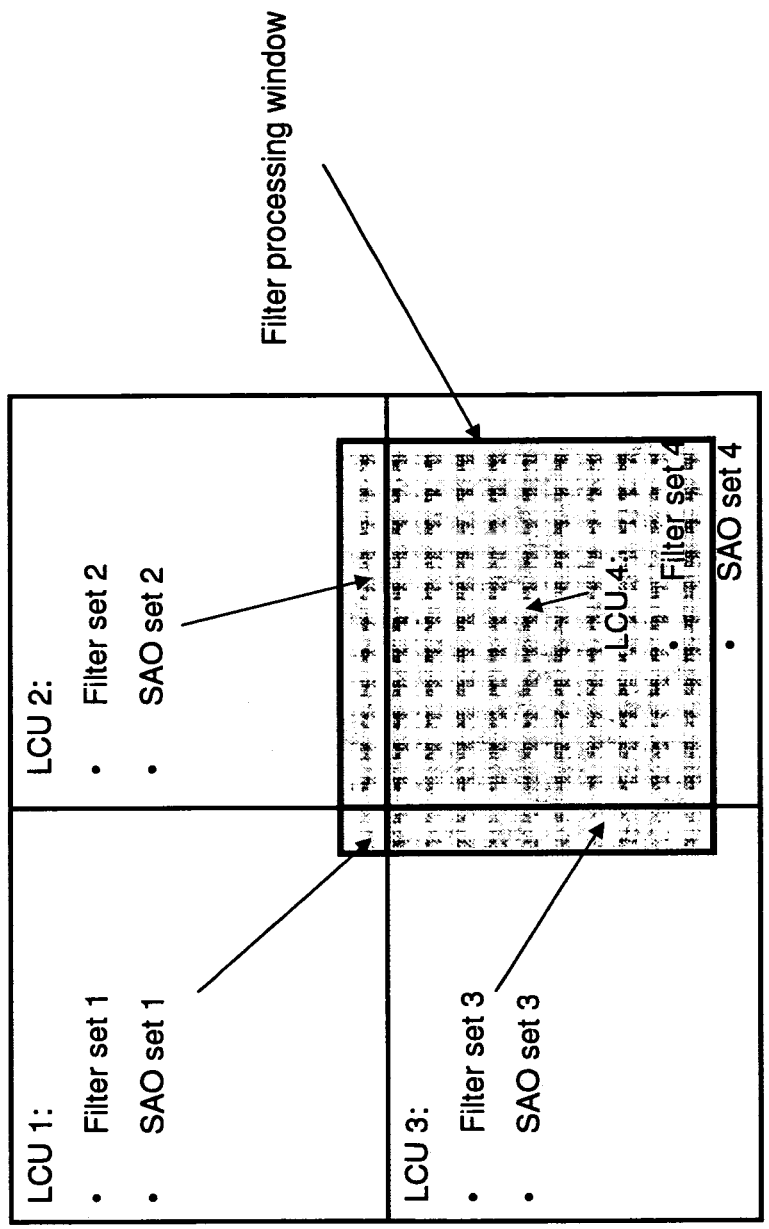
FIG. 13 is a general illustration of a conventional filtering scheme and pipelining for LCU for both SAO and ALF.

A comprehensive illustration of the situation, as explained step by step in the foregoing figures, is given in FIG. 13 providing an excerpt of a filtering pipeline for LCU. FIG. 13 shows four filtering regions (as in the previous figures: four single LCUs: LCU1, LCU2, LCU3 and LCU4 are illustrated). Each of the filtering regions (LCUs) have their own (ALF) filter set and SAO parameter set: filter sets 1, 2, 3 and 4, and SAO sets 1, 2, 3 and 4. The dark region in FIG. 13 shows the filtering window for SAO and ALF, which has been based on LCU 4 but shifted in view of the non-availability of right and bottom samples (as illustrated with respect to the previous figures). Accordingly, for filtering processing within the filtering window, four different ALF sets and SAO sets need to be used.

Said problem will be explained in more detail with reference to the following FIGS. 14 to 16.

Figure 14:
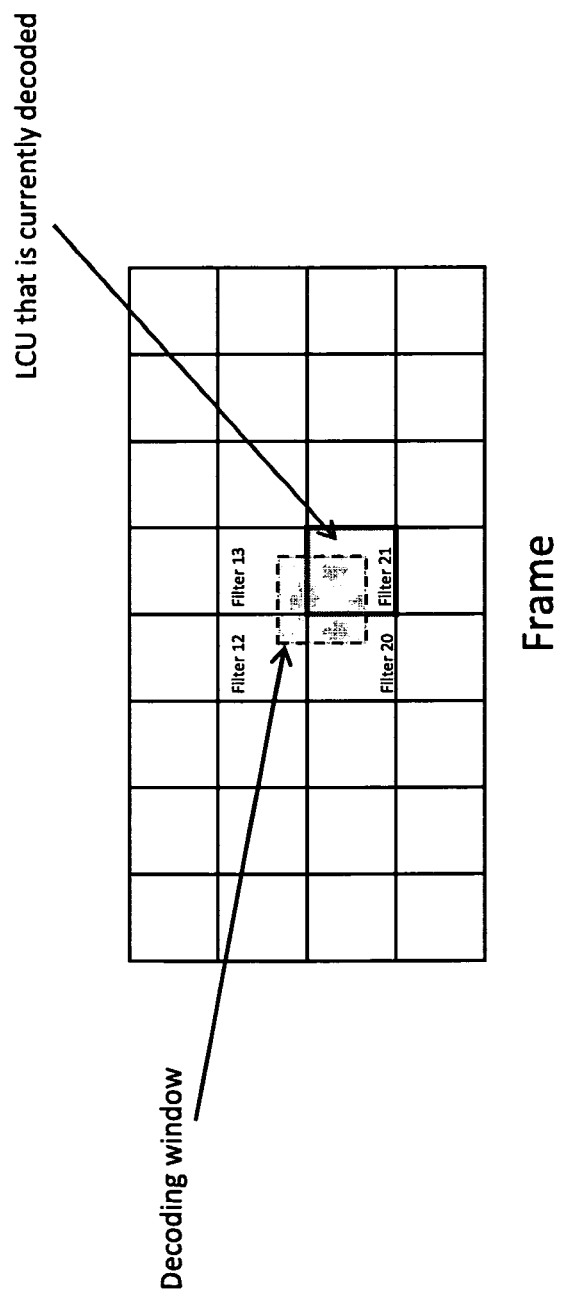
FIG. 14 provides an illustration of the problem occurring in conventional LCU filtering.

FIG. 14 illustrates a situation wherein a frame is decoded on an LCU basis. More specifically, pipelining is performed so as to decode the LCUs one after the other, starting in the upper left corner, and subsequently processing the LCUs row by row from left to right and from top to bottom (raster scan order). In said order, the LCUs are subsequently labeled by the numbers of the respective filter sets. For convenience, FIG. 14 shows only labels of LCUs with filter numbers 12, 13, 20 and 21. Further, in FIG. 14, it is assumed that the LCU that is currently being decoded is the one corresponding to filter 21, as can be seen by the highlighting of the respective LCU boundary.

The shaded region in FIG. 14 corresponds to the filtering window in the decoder loop. As explained above, the filtering window is not aligned with the LCU boundaries, since deblocking has not yet been performed at the right and bottom LCU boundary regions.

Figure 15:
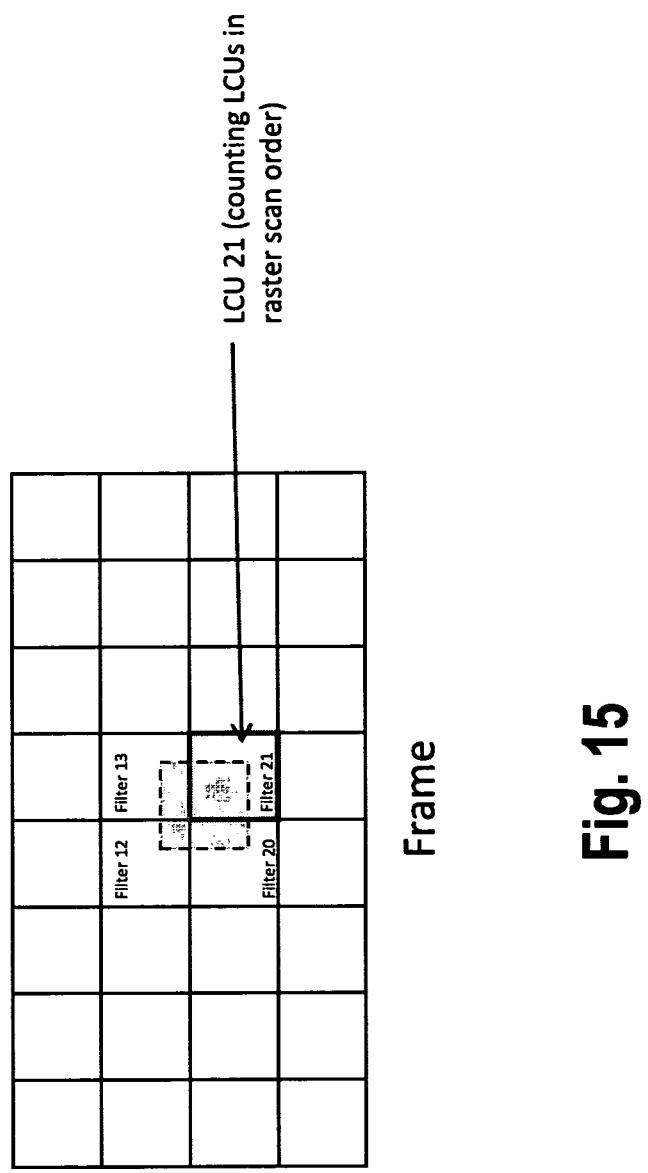
FIG. 15 is a continuation of the illustration of the problem of FIG. 14.

FIG. 15 generally shows the same situation that is schematically illustrated in FIG. 13. The four LCUs (LCU 1, LCU 2, LCU 3 and LCU 4) of FIG. 13 correspond to the four LCUs labeled "Filter 12", "Filter 13", "Filter 20" and "Filter 21" in FIG. 15 (wherein the LCUs are counted in the above described raster scan order).

Hence, in compliance with the general description of FIG. 13, in order to filter the highlighted LCU 21, the parameter sets for following LCUs are required: Filter 13 from upper LCU, Filter 12 from upper left LCU, Filter 20 from left LCU and Filter 21 from current LCU. As generally described with reference to FIG. 13, the word "filter" generally means "ALF filter set" and/or "SAO filter set".

The memory requirements in the state of the art pipeline are further described with reference to FIG. 16. As in the previous figures, it is assumed that the LCUs are processed one by one in a raster scan order, as is usually done in the encoder or decoder. FIG. 16 once more relates to the time instance when the LCU 21 is processed (encoded or decoded).

In the example, filter 12 was used during the processing of LCU 12. However, the filter parameters of filter 12 have to be stored in a memory, since they are also required for the processing of LCU 21, as has been explained with reference to the previous figures. In other words, filter 12 has to be present in a memory between the time instances of the beginning of the processing of LCU 12, and the end of the processing of LCU 21. At the latter point of time, parameters of filter 12 can be discarded from the memory since they are not going to be required any more.

More generally speaking, every LCU in an LCU row requires filter parameters from the respective upper LCU row. As a result, the latest N filter parameters have to be stored in a memory at any time, wherein N means "number of LCUs in an LCU row+2".

As a consequence, the state of the memory during the processing of LCU 21 is as follows: the memory includes the filter parameter sets of the following filters: filter 12, filter 13, filter 14, filter 15, filter 16, filter 17, filter 18, filter 19, filter 20 and filter 21.

At the current time instance (during the processing of LCU 21), only filters 12, 13, 20 and 21 are required. However, at the next time instance (during the processing of LCU 22), filters 13, 14, 21 and 22 are going to be required, hence filter 14 needs to remain stored in the memory for later reference, and so on.

Thus, the problem of the prior art can be summarized as follows: there is an ALF parameter set and an SAO parameter set associated with each LCU (more generally speaking, each filtering region of several LCUs) of a frame. The parameter sets can be different for each LCU (more generally: filtering region).

However, the LCU-based decoding philosophy, which is the basis of almost all of the hardware implementations, has a filtering window which is not aligned with LCU borders.

As a result, the filtering window intersects with more than one LCU. This means that within the filtering window up to four different ALF and SAO parameter sets need to be used. In other words, there are up to four separate regions that need to be filtered with four different SAO and ALF filters. It is further noted that the number of different parameter sets is generally implementation dependent. While in the preceding figures a number of four separate parameter sets has been illustrated by way of example, in an alternative implementation, there may, for instance, be two different ALF and SAO parameter sets.

Hence, the filtering procedure according to the state of the art as outlined above is not favored by hardware implementations, since the operation is not homogenous.

The present invention solves the above described problem by displacing the filtering regions (i.e. the regions for which one of the filtering sets for the respective stage of ALF and SAO is set) so as to reduce the number of ALF filter sets and SAO sets necessary during the filtering within a filtering window. More particularly, according to an embodiment, the filtering regions are displaced in such a way that only one ALF filter set and SAO set is necessary during the filtering of a filtering window, corresponding in size to an LCU (more generally: a region of one or plural LCUs).

Figure 17:
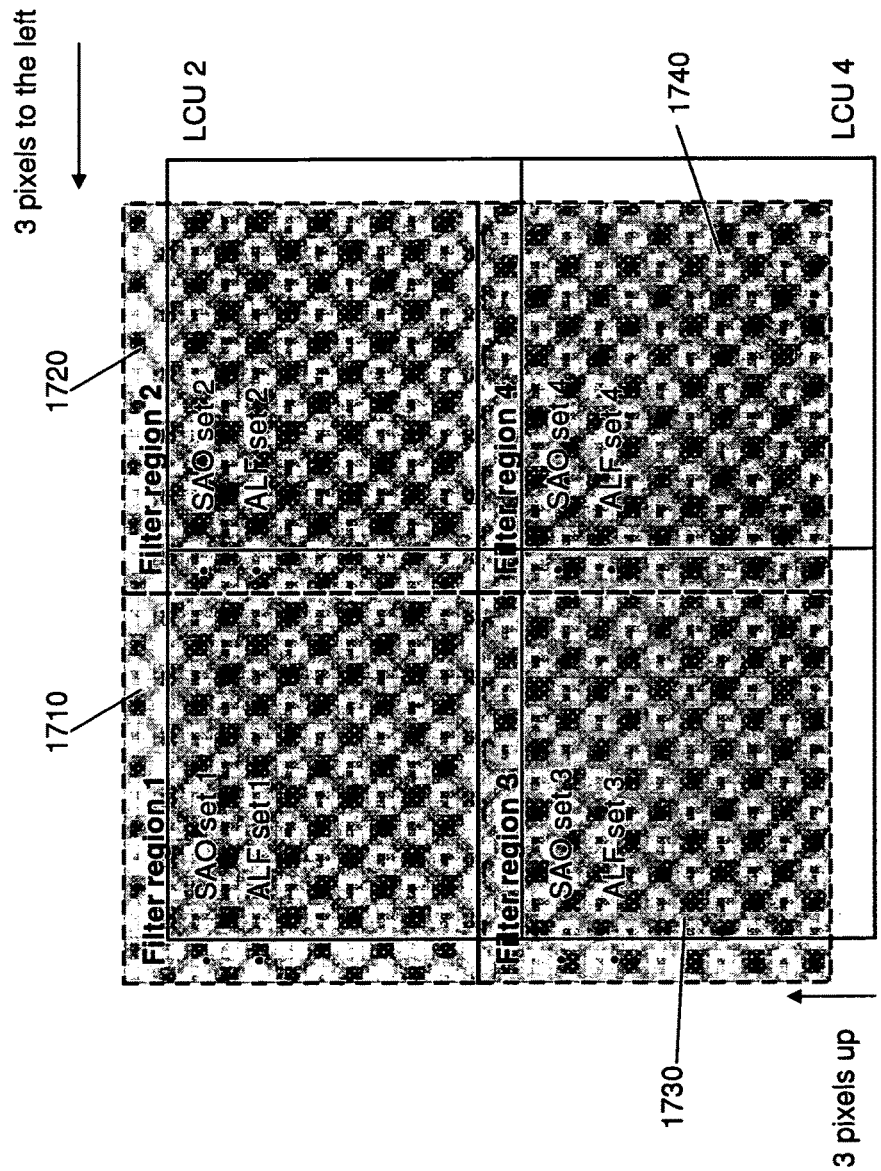
FIG. 17 provides a general illustration of the solution to the problem illustrated in the preceding figures, according to an embodiment of the present invention.

FIG. 17 illustrates an embodiment of the invention, according to which the filtering regions (parameter setting regions) for SAO and ALF are shifted in the horizontal and vertical direction by a certain amount (in the example of FIG. 17: 3 pixels up and 3 pixels to the left, in compliance with the situation that has been illustrated, for instance, in FIG. 11). As a result, the filtering regions retain the same size as an LCU but they are no longer aligned with LCU borders.

In other words, the filtering regions are shifted so as to be aligned with the filtering windows, which are, as explained above, specified by the output sequence of previous filter operations of the pipeline, such as, for instance, deblocking.

In the example of FIG. 17, there are four filter regions (Filter region 1 (1710), Filter region 2 (1720), Filter region 3 (1730), and Filter region 4 (1740)), for each of which respective SAO and ALF parameter sets are defined. Said filter regions (corresponding to the filter windows previously explained with reference to the prior art) are each shifted with respect to a corresponding LCU by 3 pixels to the left and 3 pixels up. As a consequence, the filtering regions are set in such a way that during the decoding of a filtering window having the size of an LCU, only one SAO parameter set and only one ALF parameter set is required.

Figure 16:
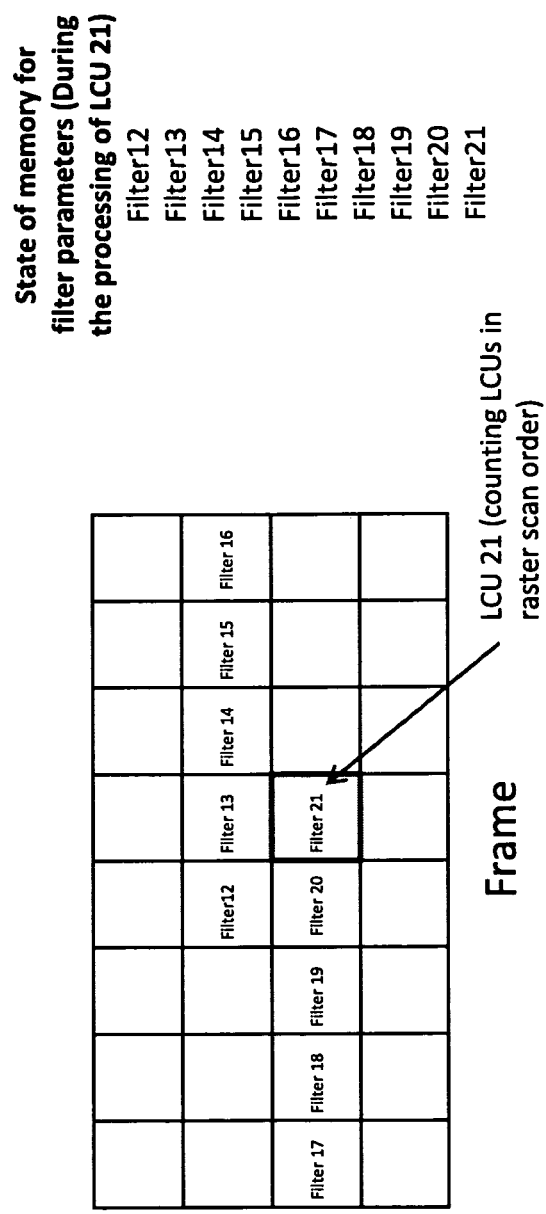
FIG. 16 provides further details illustrating the problem underlying FIGS. 14 and 15.
Figure 18:
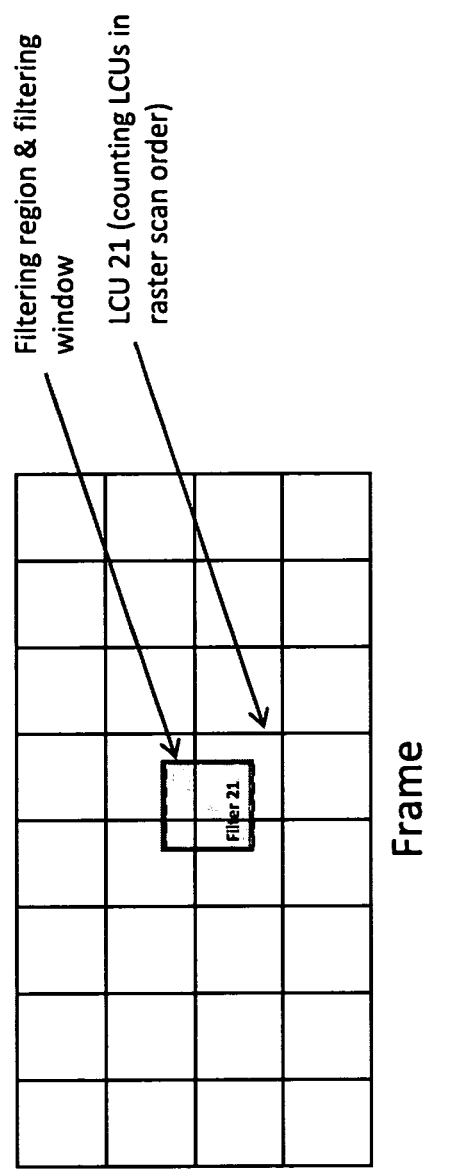
FIG. 18 provides a further illustration showing filter grid displacements, according to an embodiment of the present invention.

FIG. 18 illustrates the above outlined example of FIG. 17 with reference to the extended illustration that has been given previously with respect to FIGS. 14 to 16. Namely, the filtering regions (forming a filter grid) are displaced to align with the filtering windows, as described above. More particularly, FIG. 18 shows a filtering region and filtering window labeled "Filter 21" to be shifted with respect to LCU 21 (counting LCUs once more in raster scan order).

Accordingly, during ALF filtering of the filtering window corresponding to LCU 21, only a single filter parameter is required (filter 21 in the example).

The filter parameters that were used in the upper LCU row are not required for the filtering of the current LCU. Therefore, the memory that is required to store filter parameters of the upper LCU is eliminated.

The size of the memory for filter parameters is reduced from N (the number of LCUs in an LCU row+2) to 1.

Figure 19:
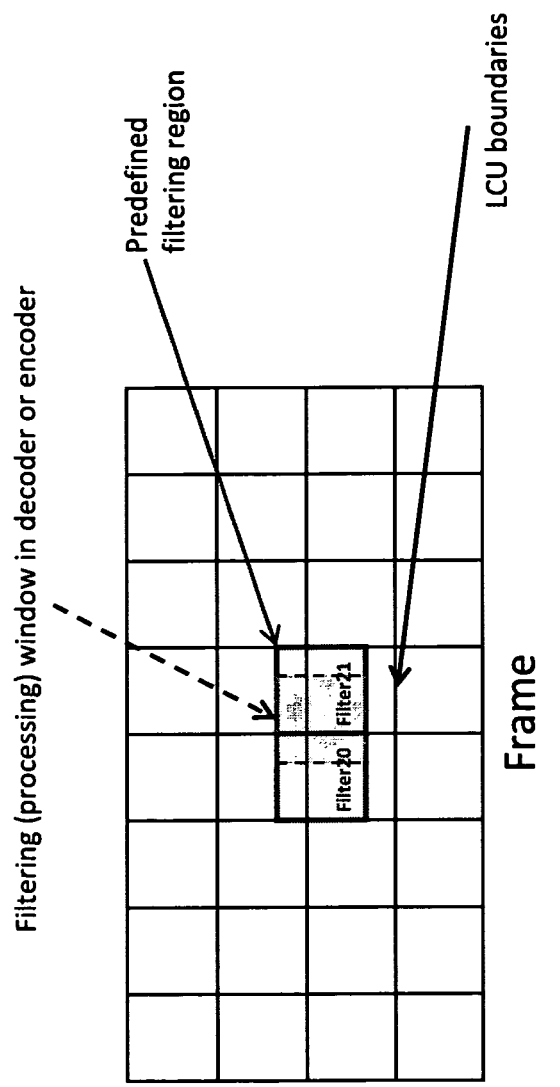
FIG. 19 provides an illustration of filter grid displacement in accordance with another embodiment of the present invention.

Another exemplary embodiment according to the present invention is illustrated in FIG. 19. FIG. 19 illustrates an embodiment wherein a filter grid displacement with respect to the LCU boundaries is performed only in a single direction, namely in the vertical direction. Accordingly, the predefined filtering regions (in FIG. 19, two of the filtering regions, labeled Filter 20 and Filter 21 have been highlighted) are shifted vertically upwards with respect to the corresponding LCU boundaries. As a consequence, the filtering window (processing window) in decoder or encoder, which is once more represented by the shaded portion in the drawing is not completely aligned with the filtering region (i.e. the horizontal borders are aligned, but the vertical borders are not aligned, since the filtering region is displaced only in the vertical region with respect to the LCU boundaries).

As a consequence, the filtering window shown in FIG. 19 intersects two filtering regions. For the filtering in a processing window, then only two filter parameter sets are required (as compared to four), which thus already accounts for a 50% reduction. Hence, the filter parameters from the upper LCU row do not need to be stored in a memory. Only one filter parameter set from the left neighbor needs to be stored. Since thereby already a considerable decrease of memory requirements as compared to the prior art is achieved, it can be seen that most of the benefit of the invention results from shifting the filtering regions in the vertical direction. Hence, within the framework of the present invention, the displacement in a vertical direction only already results in a considerable improvement.

Figure 20:
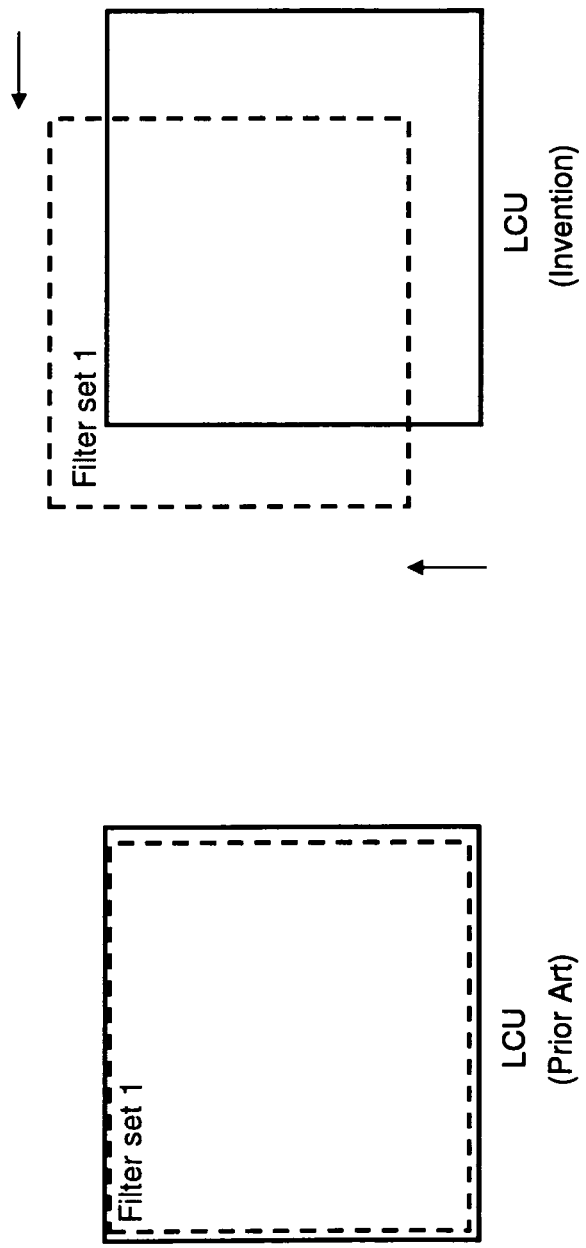
FIG. 20 illustrates further details of embodiments of the present invention.

Further details of the invention are more generally illustrated in FIG. 20. On the left hand side, the situation in accordance with the current state of the art is illustrated, wherein a filtering region, for which a filter set (filter set 1) is defined (the term "filter set" once more summarizes both parameter sets for ALF and SAO) is aligned with LCU boundaries. The right hand side shows the situation in accordance with the present invention, wherein the filter region is displaced by a certain amount with respect to the LCU.

The motivation underlying the solution proposed by the present invention can be summarized as follows:

The hardware implementation of encoder and decoder is LCU based, which means that the decoder processes an amount of data corresponding to a single LCU (or a region of several LCUs) every time. However, due to the unavailability of neighboring LCUs, some of the pixels on the right of and at the bottom of LCU borders cannot be filtered at the moment of processing (therefore, they are stored in the line memory and filtered later—"delayed filtering"). This means that the filtering operation during the processing of an LCU is not aligned with the LCU itself.

Thus, by the invention it is achieved the region for which one set of filter parameters is selected corresponds to a region having the same size as an LCU, but excluding a number of pixel columns/rows on the right/at the bottom side, and instead including a corresponding number of rows/columns from LCUs that have been generally filtered earlier, in order to perform the delayed filtering.

Figure 21:
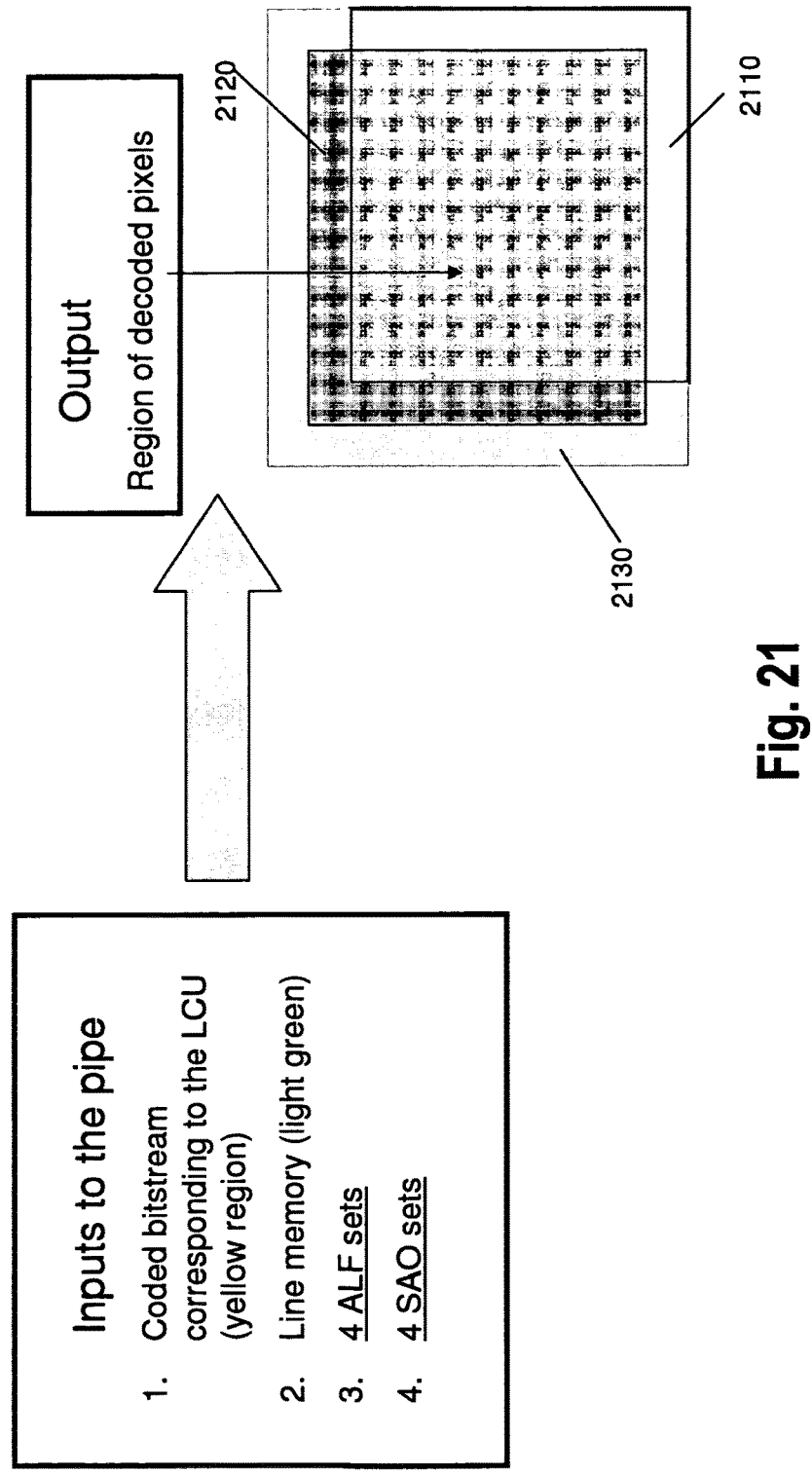
FIG. 21 illustrates, as a comparative example, a prior art filtering pipeline.

A comparison between a prior art pipeline scheme and the pipeline scheme according to the present invention will begin below with reference to FIGS. 21 and 22. FIG. 21 illustrates a prior art pipeline (a 64×64 pipeline is assumed). Input through the pipeline are: a coded bit stream corresponding to the LCU (rectangle 2110, i.e. the portion of the overall scheme including the bottom right corner), the line memory (i.e. the remaining portion of the overall area of the scheme, arranged on the left hand and top sides of rectangle 2110 and not having a highlighted boundary (region 2130), four ALF sets and four SAO sets (in case both ALF and SAO processing stages are to be performed).

The output is a region of decoded pixels corresponding to the central rectangle of the drawing (rectangle 2120 symmetrically arranged in the drawing).

Figure 22:
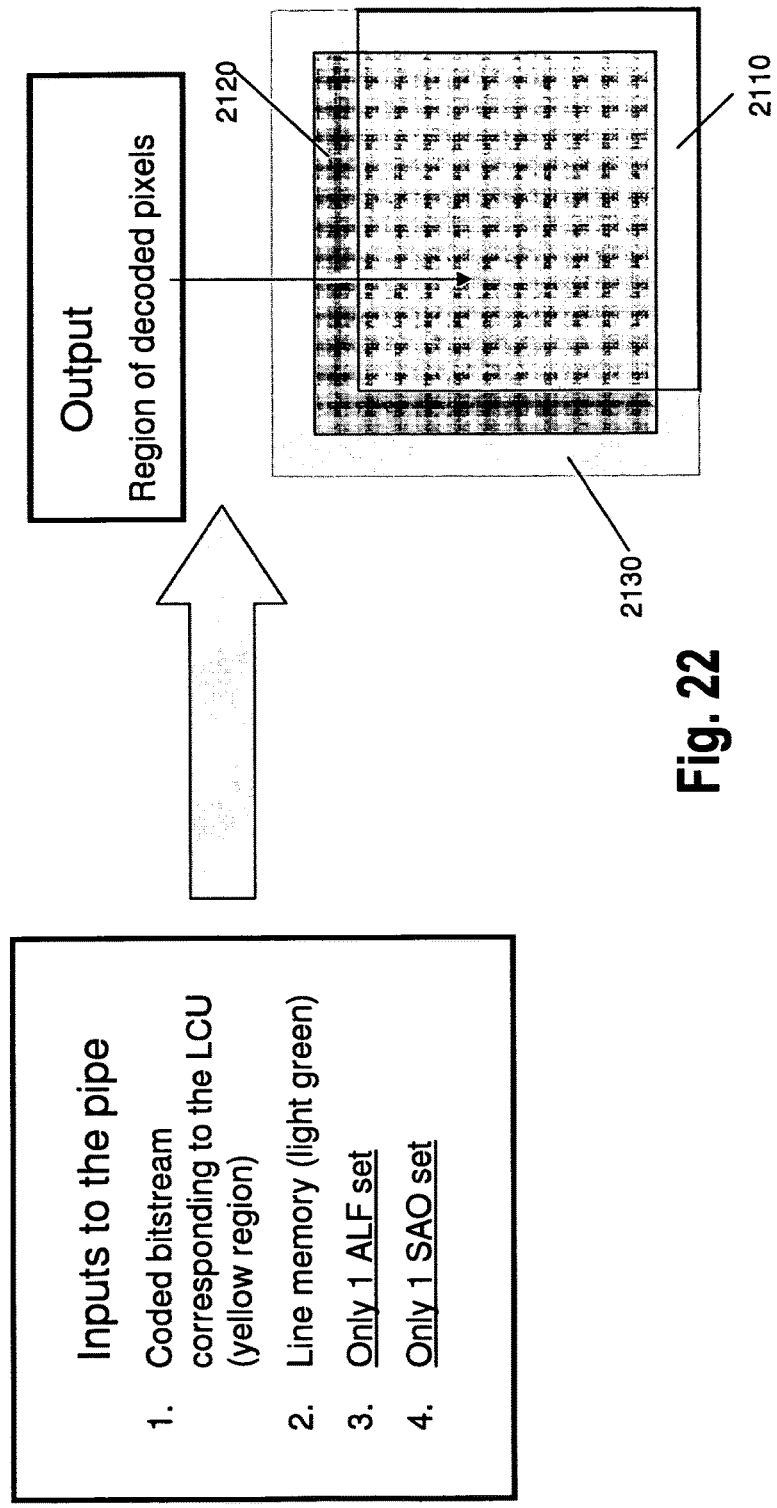
FIG. 22 illustrates a filtering pipeline according to an embodiment of the present invention.

In the invented pipeline, shown in FIG. 22, the situation differs from FIG. 21 only in that, on the input side, only a single ALF set and a single SAO set are required.

As a consequence, the amount of ALF filter data and SAO data as input to the pipeline is reduced. Pipeline design is simplified since filters are fixed within a processing window. In the prior art, plural (for instance, two or four) different filter and SAO sets are used in several (for instance, two or four) different parts of a filtering window.

Further details of the present invention will be summarized below and illustrated with respect to plural examples embodying aspects of the present invention. Generally, the filtering region for SAO and ALF can be displaced by different amounts. In other words, the displacement of the grids for SAO can be different or the same amount. Moreover, the amount of the displacement can be predefined according to the codec configuration, or can be transmitted in the bit stream.

A first illustrative example for application of grid displacement in accordance with the present invention is described with reference to FIGS. 23 and 24. The example relates to grid displacement for sample adaptive offset (SAO).

Figure 23:
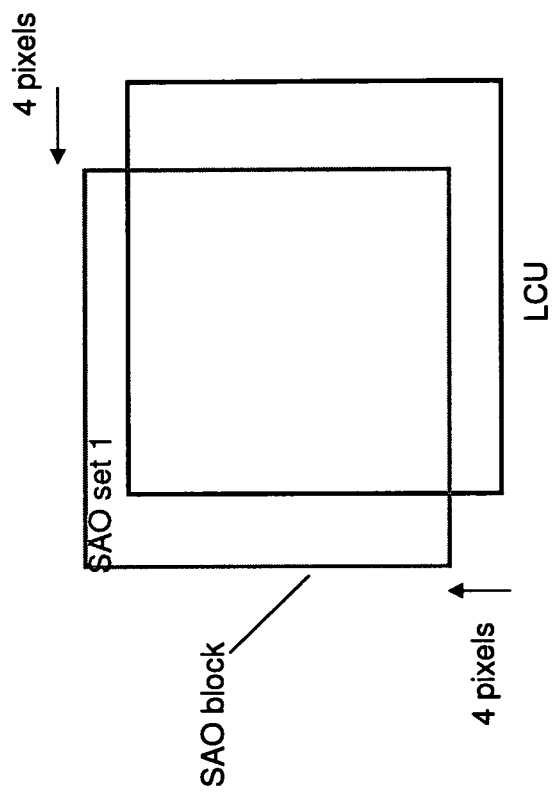
FIG. 23 illustrates the application of a filter grid displacement according to a first exemplary embodiment of the present invention.

As can be seen from FIG. 23, there is a shift of the filtering region for SAO (labeled "SAO block", corresponding to SAO parameter set 1 in the figure) with respect to the corresponding LCU by a certain amount vertically upwards and horizontally towards the left hand side. Although the figure exemplifies an amount of four pixels of shift in each direction, the amount of displacement may vary. In the current example, the adaptive offset operation is illustrated based on the specification in document JCTVC-D122 (JCTVC-D122, "CE8 subset 3: Picture Quadtree Adaptive Offset", Daegu, Korea, January 2011).

According to the illustrated scheme, there are three lines of pixels that are going to be de-blocked later, as previously illustrated with respect to FIG. 11.

In the figure, the cross shape shows a pixel classification pattern in SAO, as illustrated with respect to FIG. 3. According to the filtering order, SAO cannot use non-deblocked pixels.

Figure 24:
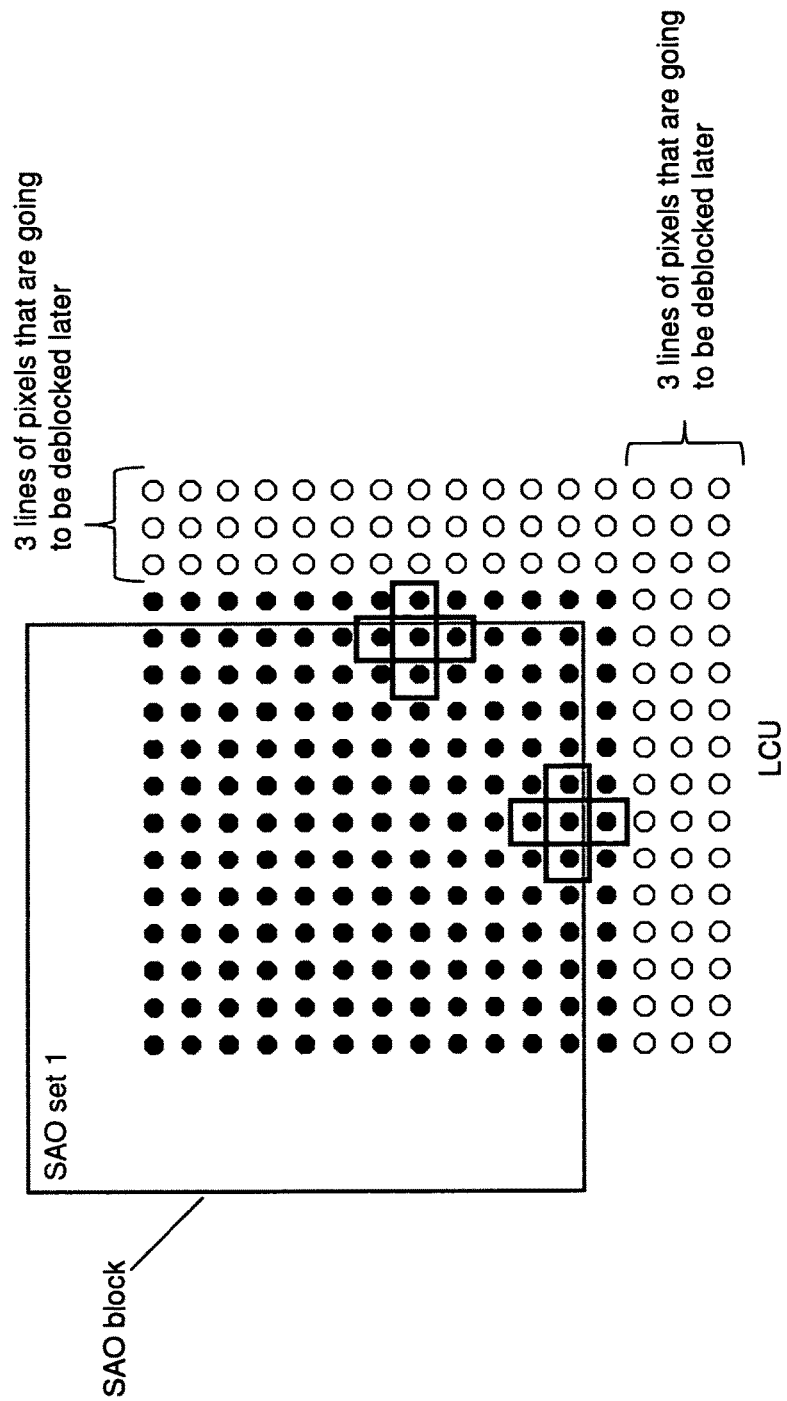
FIG. 24 illustrates further details of the exemplary embodiment of FIG. 23.

In accordance therewith, FIG. 24 shows that processing of the SAO block does not require any non-deblocked pixels, if the SAO grid is displaced by four pixels to the top and left. Thus the displacement by four pixels in two directions is sufficient to avoid the necessity of using non-deblocked pixels in the present example.

Figure 25:
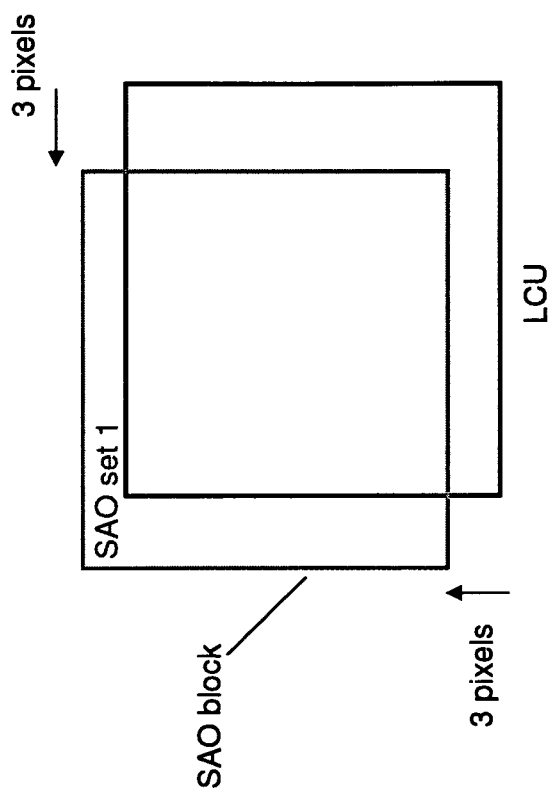
FIG. 25 illustrates application of a filter grid displacement according to a second exemplary embodiment of the present invention.

In another example, illustrated in FIG. 25, only a shift by three pixels upwards and to the left hand side is illustrated. Such an amount of displacement is alternatively possible, and can be employed, for instance, in the framework of JCTVC-E049 (JCTVC-E049, "CE13: Sample Adaptive Offset with LCU Independent Decoding", Geneva, March 2011). Without going into details, in this case a shift by three pixels would be sufficient since the processing of pixels near the LCU will be skipped, in order to avoid the usage or pixels outside an LCU.

Figure 27:
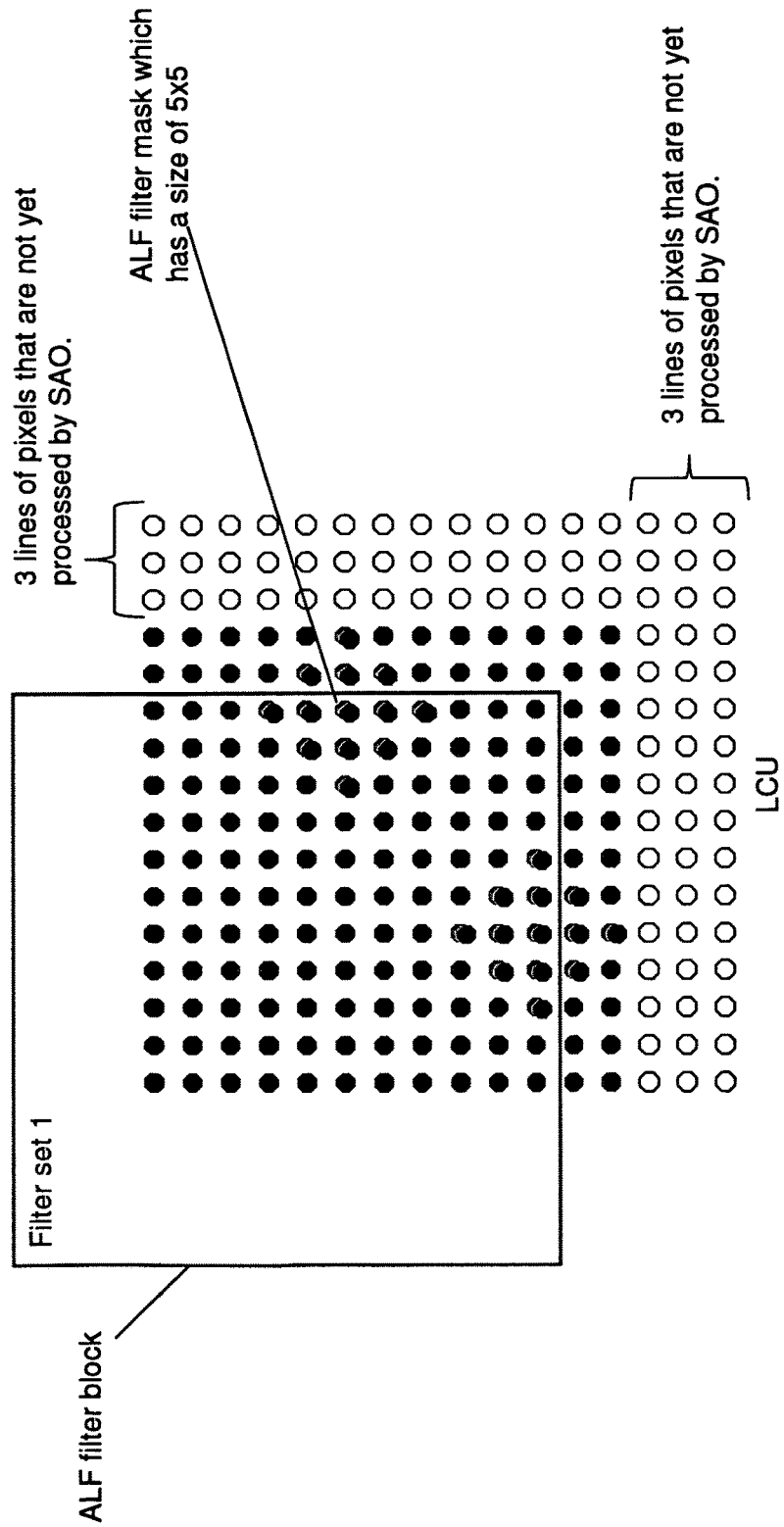
FIG. 27 illustrates further details of the exemplary embodiment of FIG. 26.

A third example for application of grid displacement according to aspects of the present invention will be described below with reference to FIGS. 26 and 27. FIGS. 26 and 27 relate to grid displacement for adaptive loop filtering (ALF). More specifically, the example is based on the state of the art method "Region Adaptive Loop Filter", which is described in the above mentioned document JCTVC-E046. In accordance therewith, a picture frame is divided into substantially equal sized filtering regions, and the region borders are aligned with LCU borders (cf. also the general description with respect to FIG. 4 above).

As will be explained in more detail below with reference to FIG. 27, according to the invention all regions are shifted five pixels up and left in the present example. Moreover, as illustrated in the present FIG. 26, the first row and column of regions are shrunk and the last row and column of regions are expanded. As in the previous examples, the amount of displacement is not limited to a number of five pixels, but may vary.

The drawing on the left hand side of FIG. 26 illustrates the state of the art situation (similar to FIG. 4). On the right hand side, the division of a picture frame in accordance with the example of the invention is illustrated. As can be seen therefrom, the general shifting rule by five pixels upwards and to the left hand side leads to a shrinkage of the regions by an amount of five pixels in the leftmost column (Filter set 1, Filter set 5 and the filter sets below), and the first row of regions (Filter set 1, Filter set 2, Filter set 3 and Filter set 4). On the other hand, the rightmost column and the bottom row of regions are expanded by five pixels horizontally and vertically, respectively. More specifically, the region corresponding to Filter set 4 and regions below are extended horizontally by five pixels, while the regions of the bottom row are extended by five pixels vertically.

Figure 1:
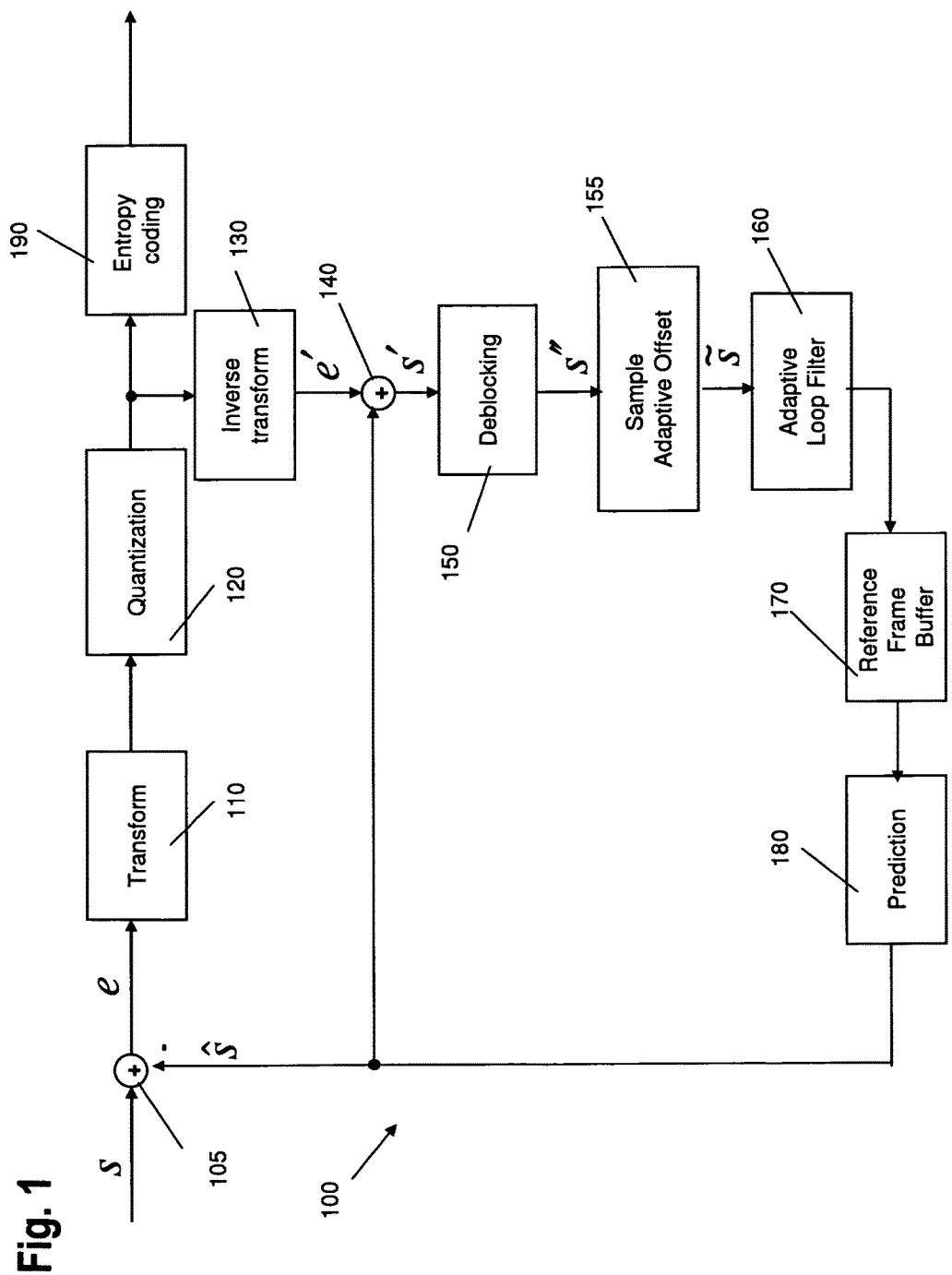
FIG. 1 is a block diagram illustrating an example of a video encoder.
Figure 2:
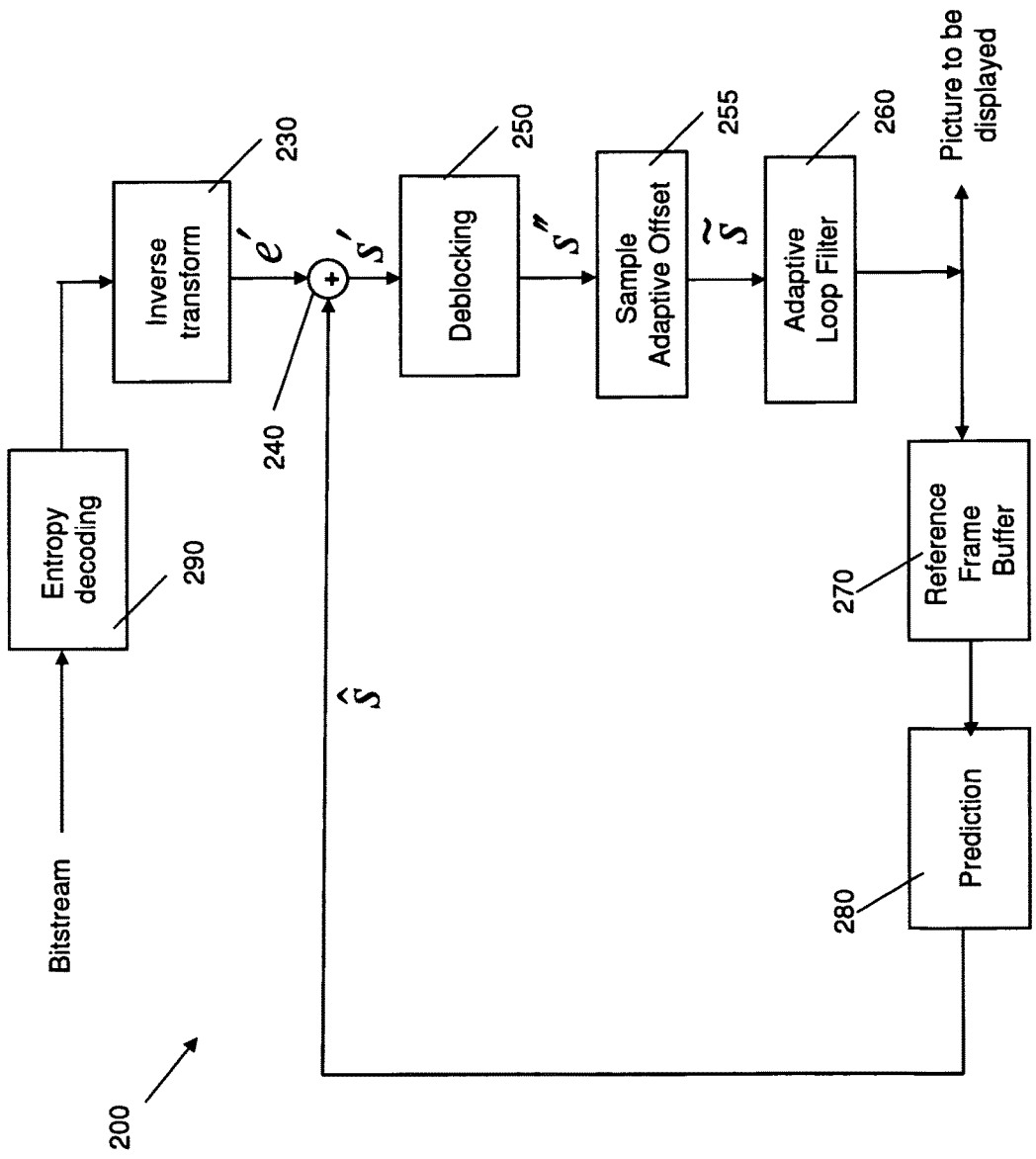
FIG. 2 is a block diagram illustrating an example of a video decoder.

FIG. 27 explains the reason as to why a shift (displacement) by five pixels in two perpendicular directions is appropriate in the present example. As can be seen from FIG. 27, a filter region (labeled "ALF filter block" in the figure, corresponding to ALF filter set 1) has been shifted by five pixels upwards and to the left hand side with respect to the LCU boundaries. In the present case, an ALF filter mask which has a size of 5×5 has been assumed, and it has been once more assumed that there are three lines of pixels in vertical and horizontal direction, respectively, that have not yet been processed by SAO (i.e. the preceding processing stage, as illustrated in FIGS. 1 and 2). Since the size of the ALF filter mask (shown at the edges of the ALF filter block only) has a size of 5×5, the displacement of five pixels is chosen to be sufficient in order to avoid the necessity of using non-SAO processed samples.

More generally speaking, the amount of shift in the filter grid depends on the size of filter mask in both the horizontal and the vertical direction. If the size of the filter was 7×7 instead of 5×5, the displacement amount would be six pixels up and six to the left. The displacement amount may be determined according to the maximum filter size.

In the following FIGS. 28 to 31, handling of filter grid displacements in accordance with embodiments of the present invention will be described by way of example, in a particular situation wherein a frame is partitioned into multiple slices. Slices are sub-units of a frame that can be individually decoded. Usually they are packetized in a NALU (Network Abstraction Layer Unit), including a slice header. Thus, by subdividing a frame into slices, the delay between encoding and decoding (sub-picture level delay) can be reduced.

Figure 28:
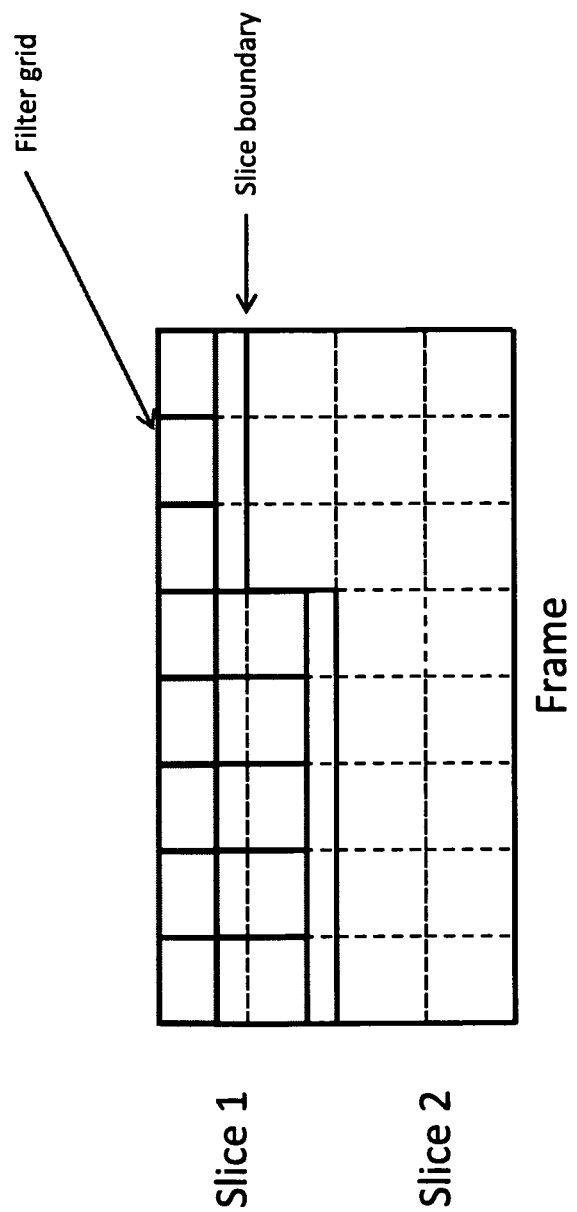
FIG. 28 provides a general illustration of filter grid displacements at slice boundaries.

In this case, handling of filter grid displacement at slice boundaries occurring within one frame requires specific attention. This is generally illustrated in FIG. 28.

In the example, the frame is partitioned into multiple slices (slices 1 and 2). According to the invention, in particular, the following three exemplary alternatives for processing can be applied at the bottom slice boundary.

Figure 29:
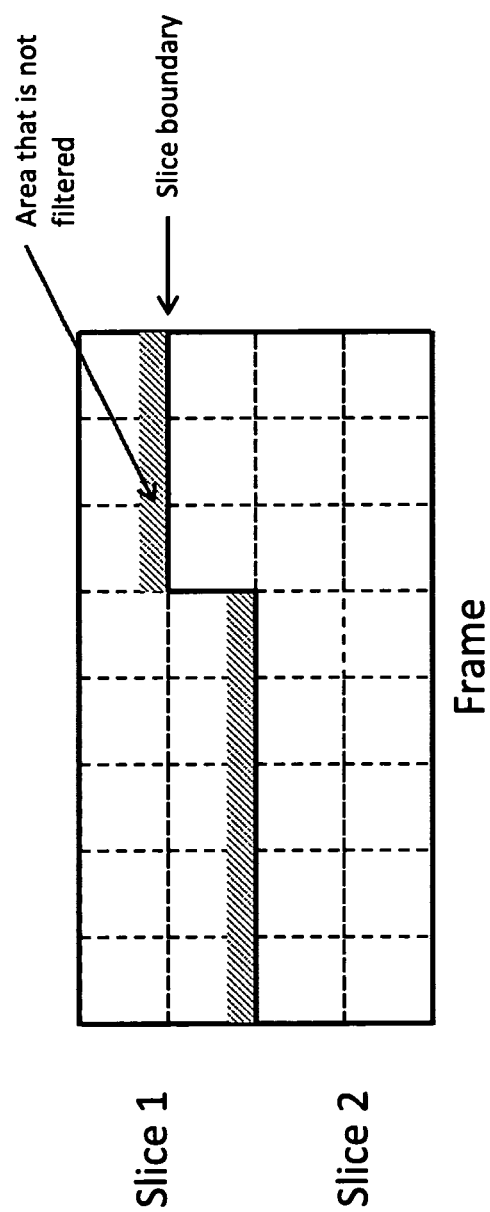
FIG. 29 provides a first exemplary embodiment for processing at the bottom slice boundary.

The first alternative is illustrated in FIG. 29. According to the processing scheme of FIG. 29, an area (corresponding to the amount of vertical shift) adjacent to the bottom slice boundary is not filtered. In FIG. 29, the respective area that is not filtered is marked as a hatched area.

Figure 30:
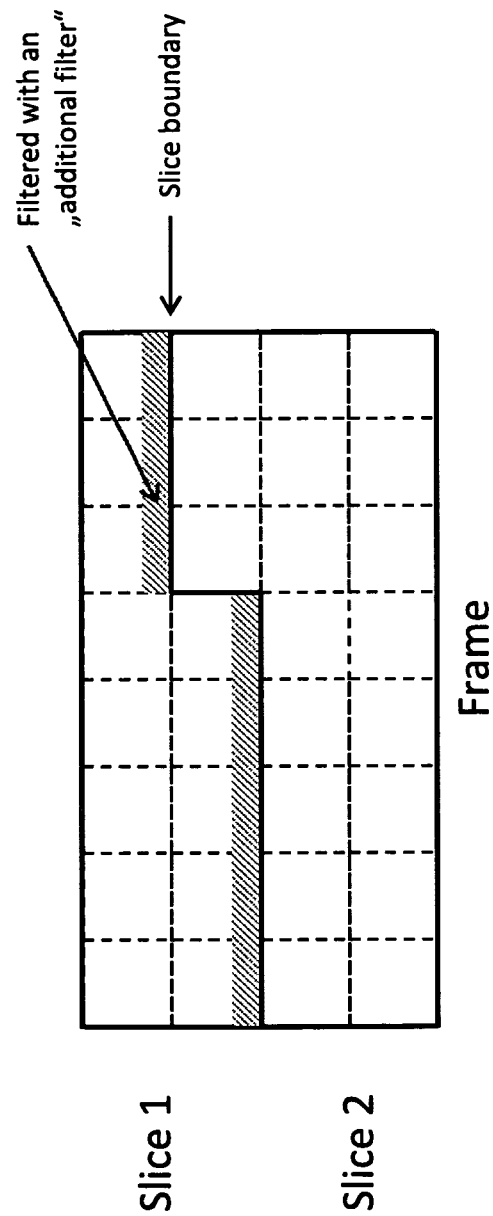
FIG. 30 provides a second exemplary embodiment for processing at the bottom slice boundary.

A second alternative for processing at a slice boundary within a frame is illustrated in FIG. 30. According to the second alternative of FIG. 30, the bottom sized boundary region (once more illustrated as hatched) is filtered with an "additional filter", which is different from the filters that are used in the "filtering regions." The parameters of the additional filter may be either predefined, or coded explicitly in the bit stream, or derived from the other parameters that are coded in the bit stream.

Figure 31:
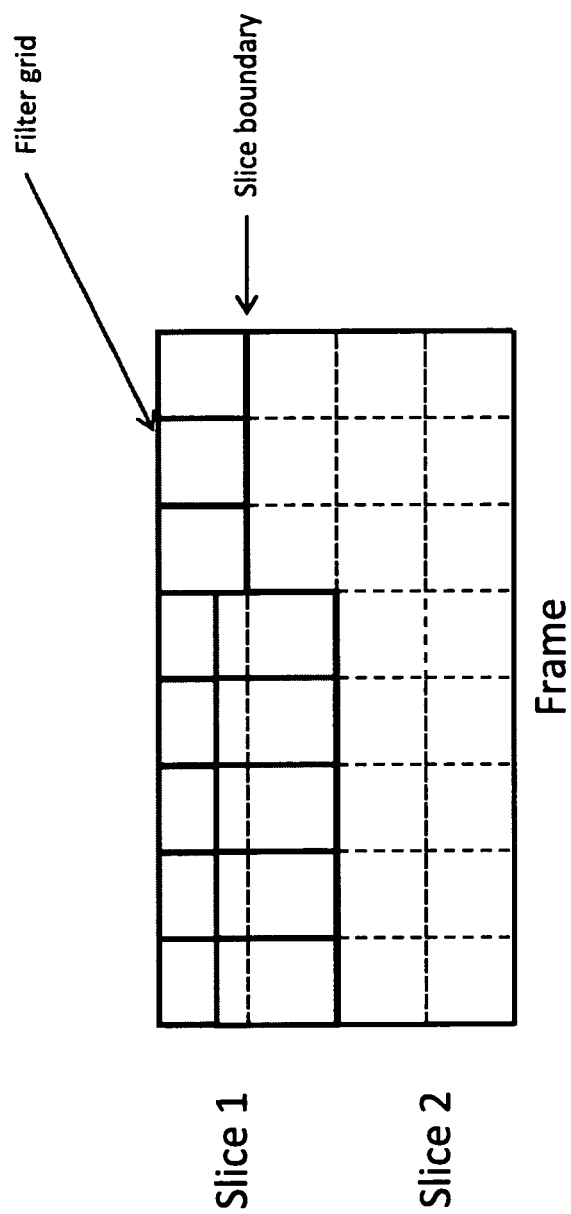
FIG. 31 provides a second exemplary embodiment for processing at the bottom slice boundary.

A third alternative is illustrated in FIG. 31. According to the third alternative of FIG. 31, the filtering regions are expanded at the slice boundaries in such a way that the whole slice is covered by the filtering regions (in a similar manner as at the frame boundaries, cf. the explanation with respect to FIG. 26 above).

Moreover according to HEVC specification document ("High efficiency video coding (HEVC) text specification draft 7", JCTVC-11003-d4, Geneva, CH, May 2012), a picture can be partitioned into multiple tiles, similar to partitioning into slices. The three alternative methods that are described above can be applied to tile boundaries as well. The processing method that is applied for tile and slice boundaries can be same or different. If the processing method is different for tiles and slices, for processing the boundaries that coincide (coding unit boundaries that are both a slice and a tile boundary), one of the methods can be given priority Additionally the processing at the slice and tile boundaries can depend on an indication in the bit stream. More specifically in the same HEVC specification document ("High efficiency video coding (HEVC) text specification draft 7", JCTVC-I1003-d4, Geneva, CH, May 2012), the filtering operation at the slice boundaries are controlled by the slice_loop_filter_across_slices_enabled_flag syntax element (Section 7.3.3 Slice Header Syntax). If the value of the syntax element is "1" the loop filters are allowed to use samples from the neighboring slice, whereas they are not allowed to use samples from the neighboring slices if the value of the syntax element is "0". Therefore the processing at the slice boundary can be controlled by the value of the slice_loop_filter_across_slices_enabled_flag syntax element. As an example one of the three alternative processing methods described above with reference to FIGS. 29 to 31 can be applied if the value of the syntax element is "0", whereas the frame can be assumed to be "not partitioned into slices" for the purpose of filtering if the value of the syntax element is "1".

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Embodiment A

Figure 32:
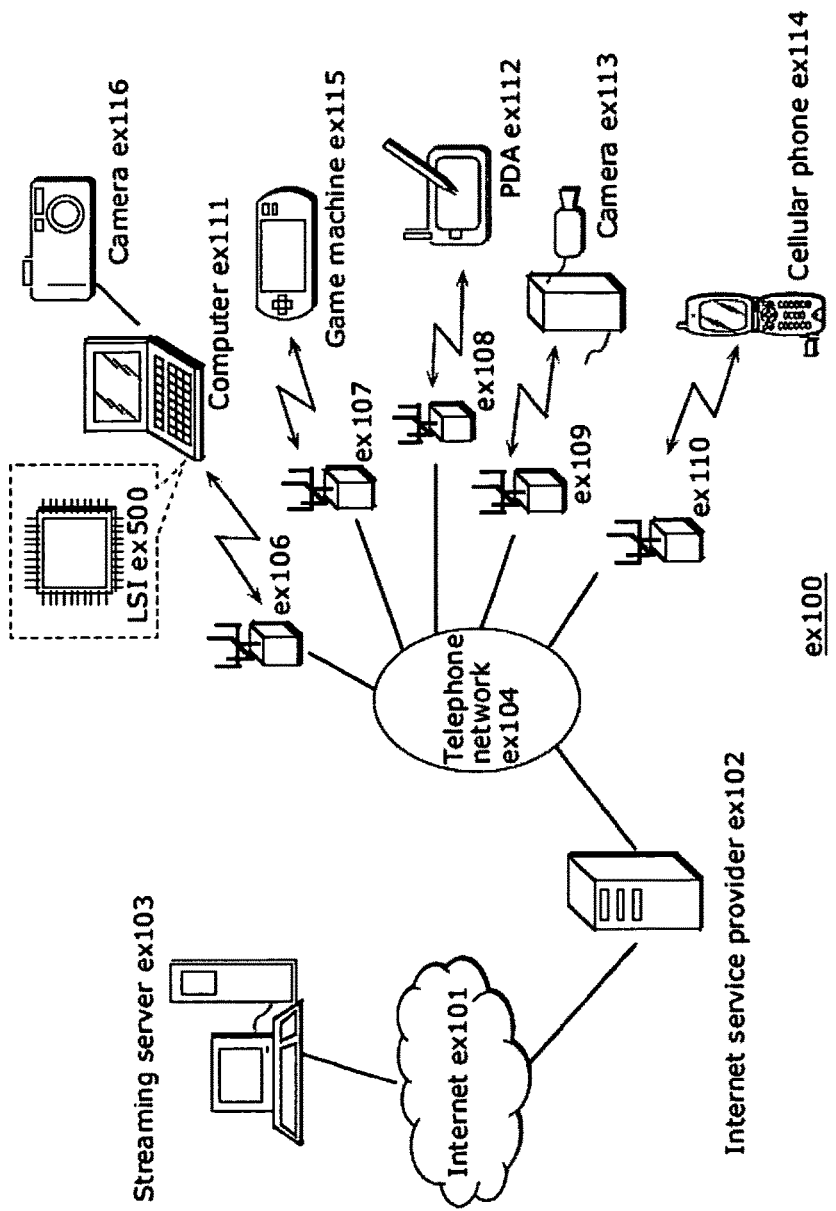
FIG. 32 shows an overall configuration of a content providing system for implementing content distribution services.

FIG. 32 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 32, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 33:
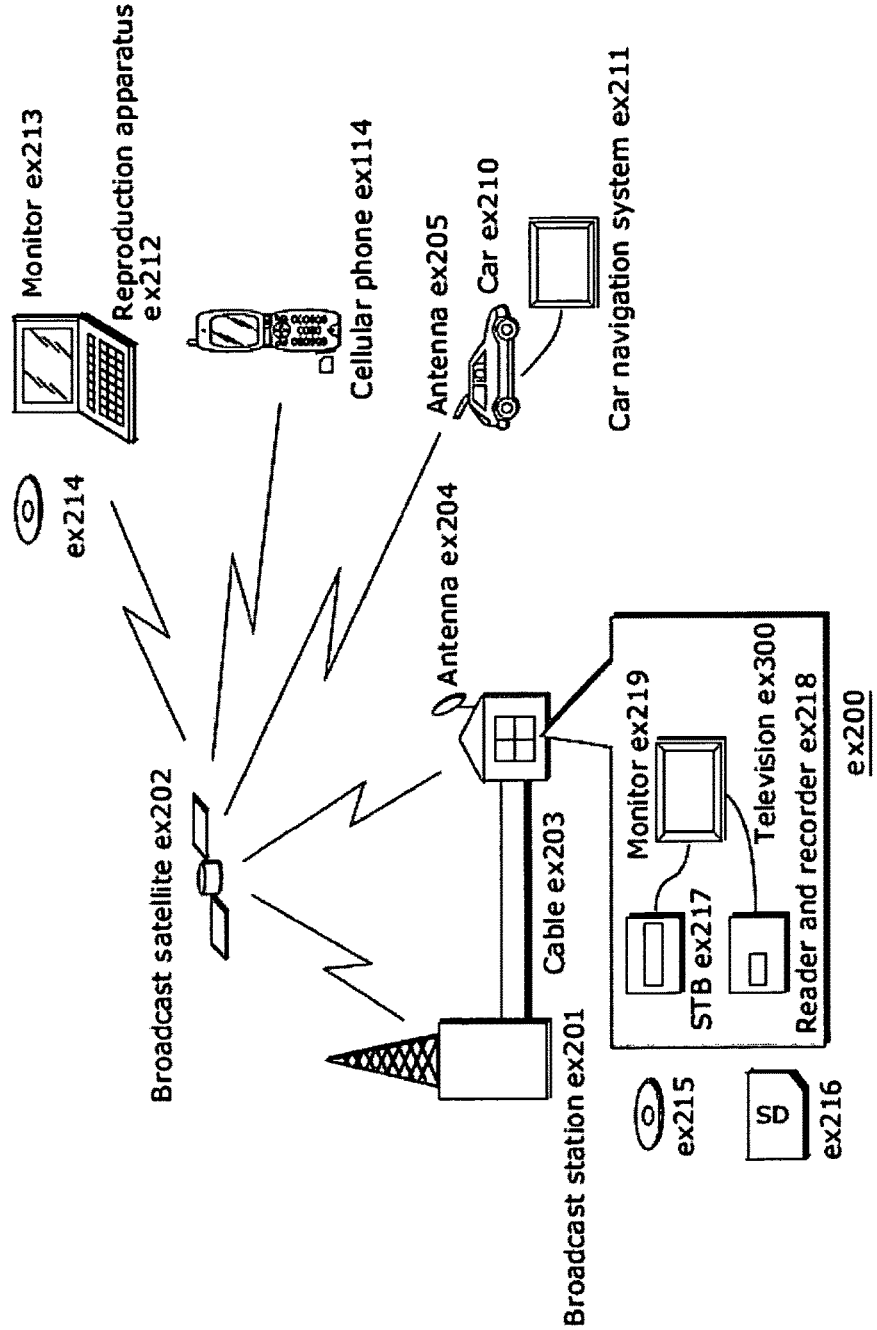
FIG. 33 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 33. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Figure 34:
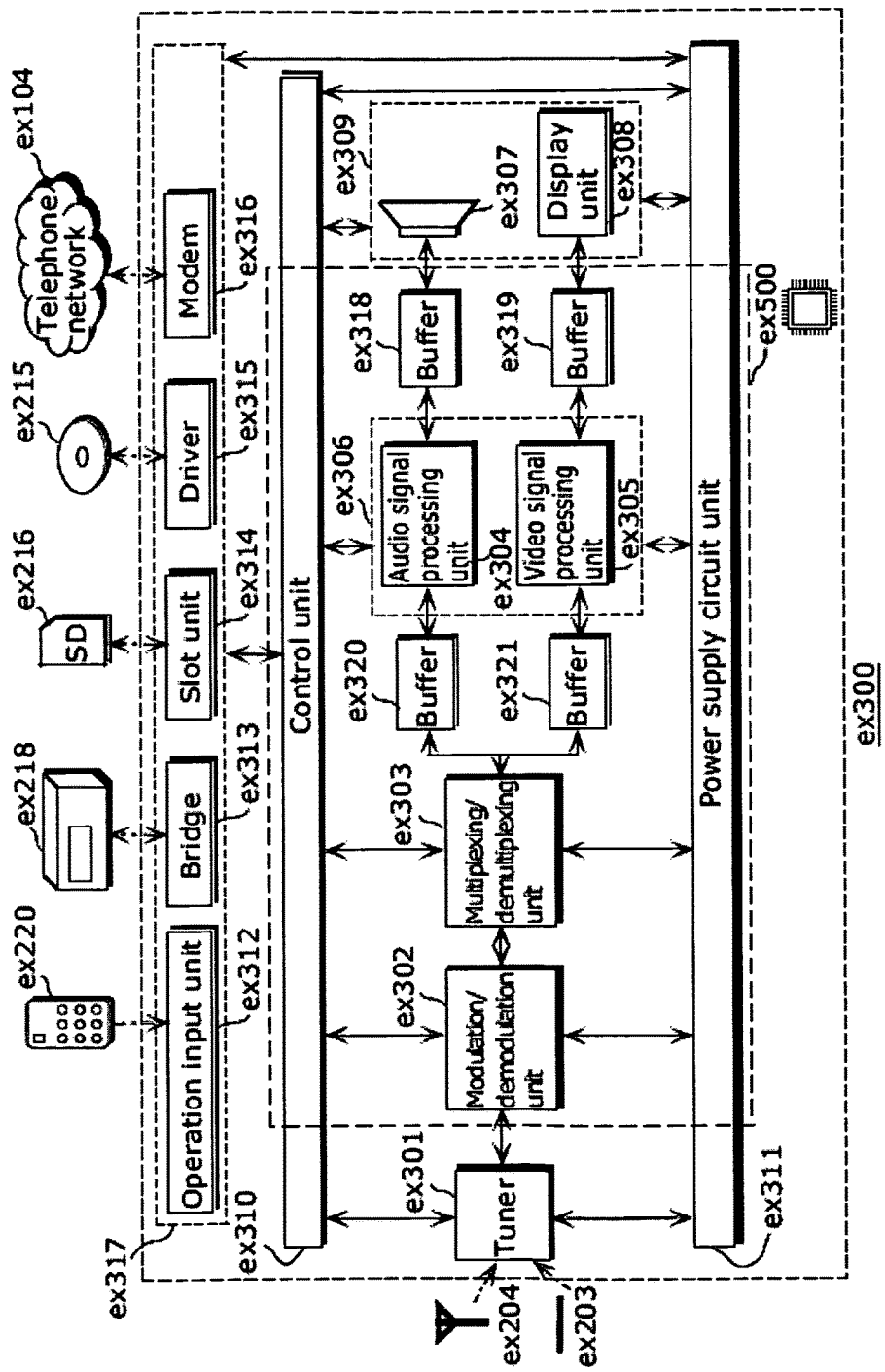
FIG. 34 shows a block diagram illustrating an example of a configuration of a television.

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300. FIG. 34 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/ demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 35:
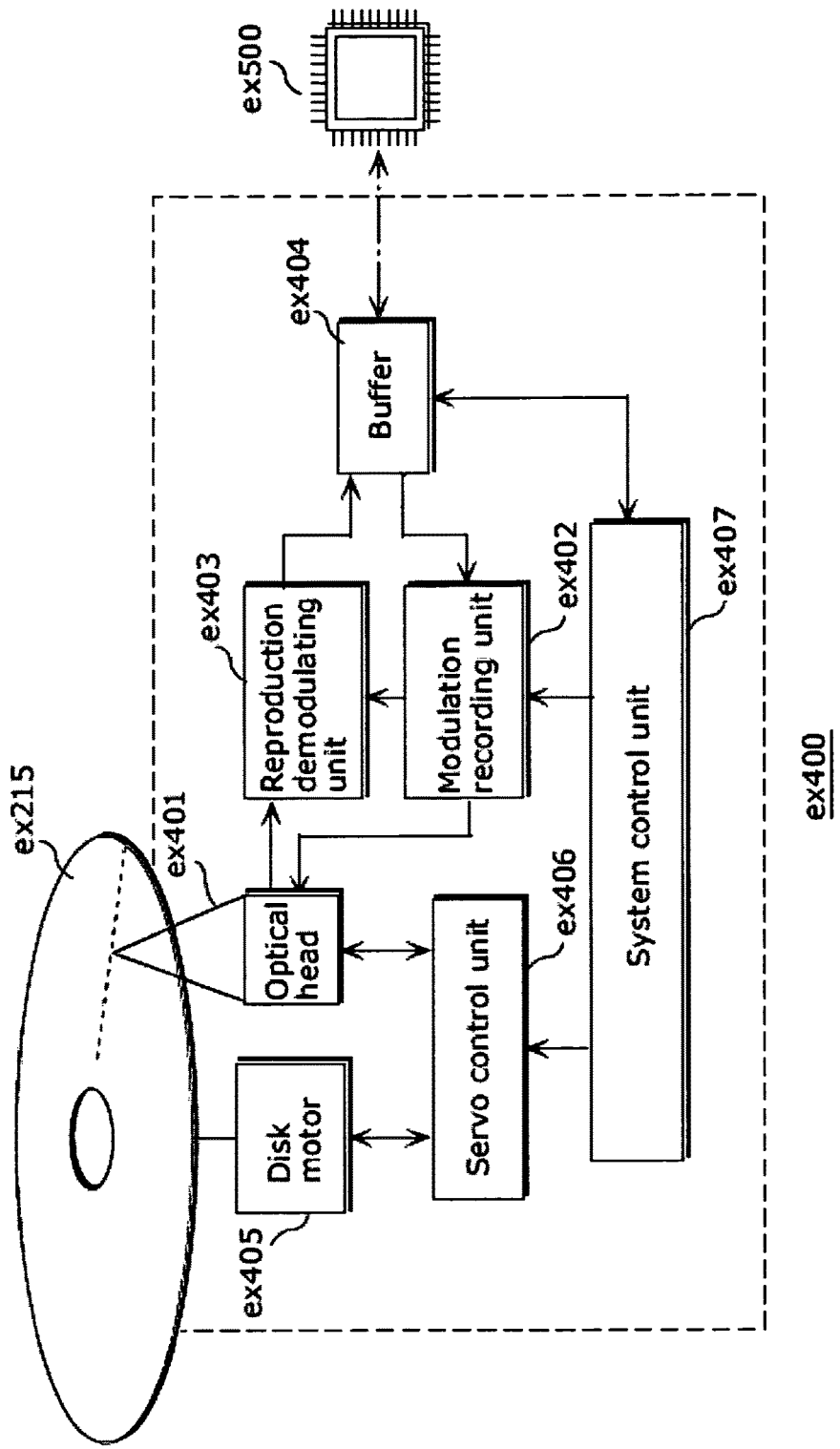
FIG. 35 shows a block diagram illustrating an example of a configuration of an information reproducing/recording unit that reads and writes information from and on a recording medium that is an optical disk.

As an example, FIG. 35 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215.

The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Figure 36:
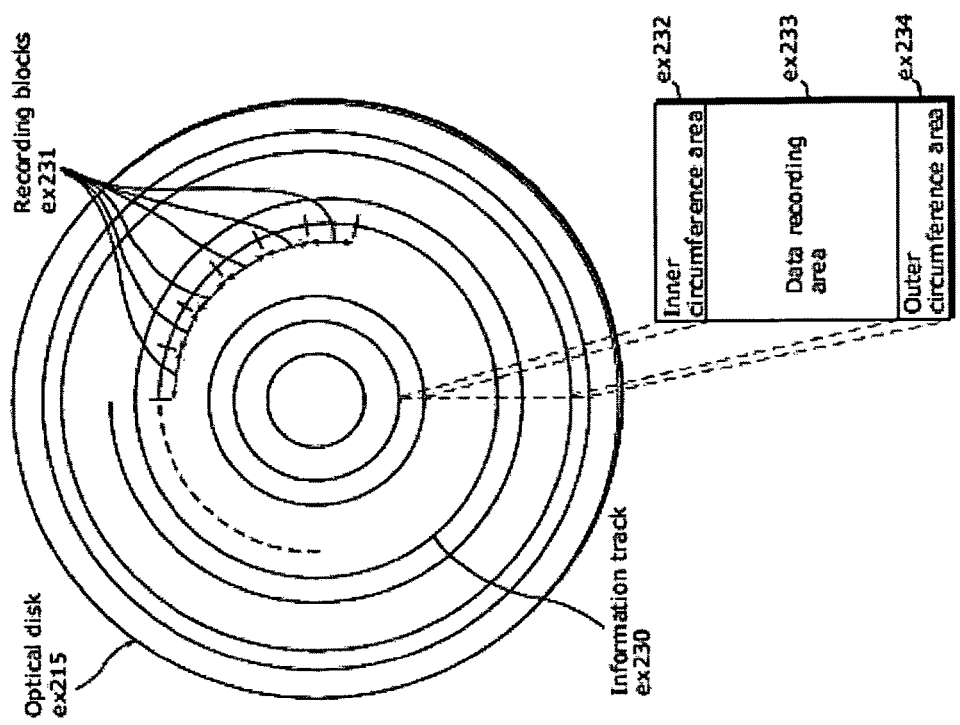
FIG. 36 shows an example of a configuration of a recording medium that is an optical disk.

Although the optical head ex401 irradiates a laser spot in the description, it may perform high-density recording using near field light. FIG. 36 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 34. The same will be true for the configuration of the computer ex111, the cellular phone ex114, and others.

Figure 37A:
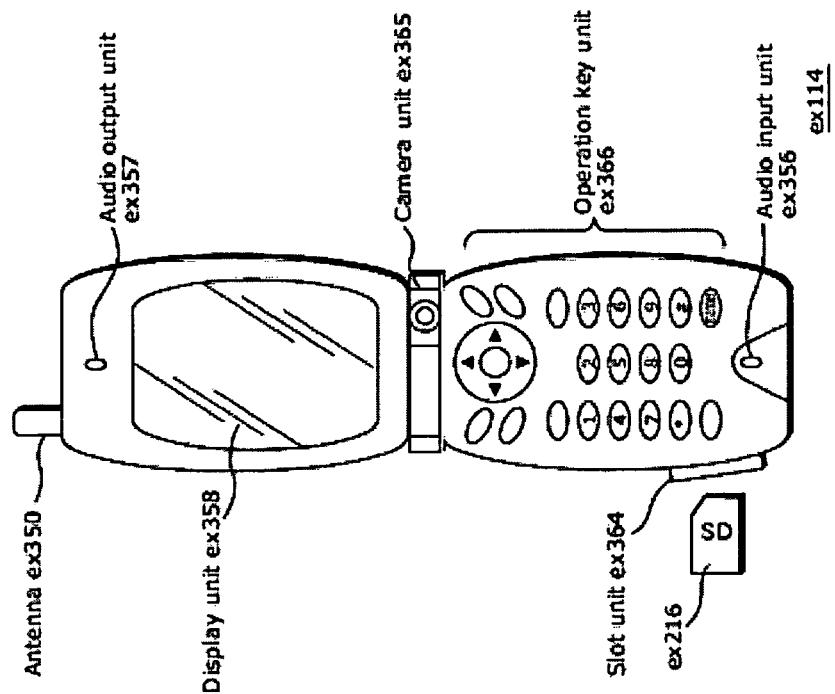
FIG. 37A shows an example of a cellular phone.

FIG. 37A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 37B:
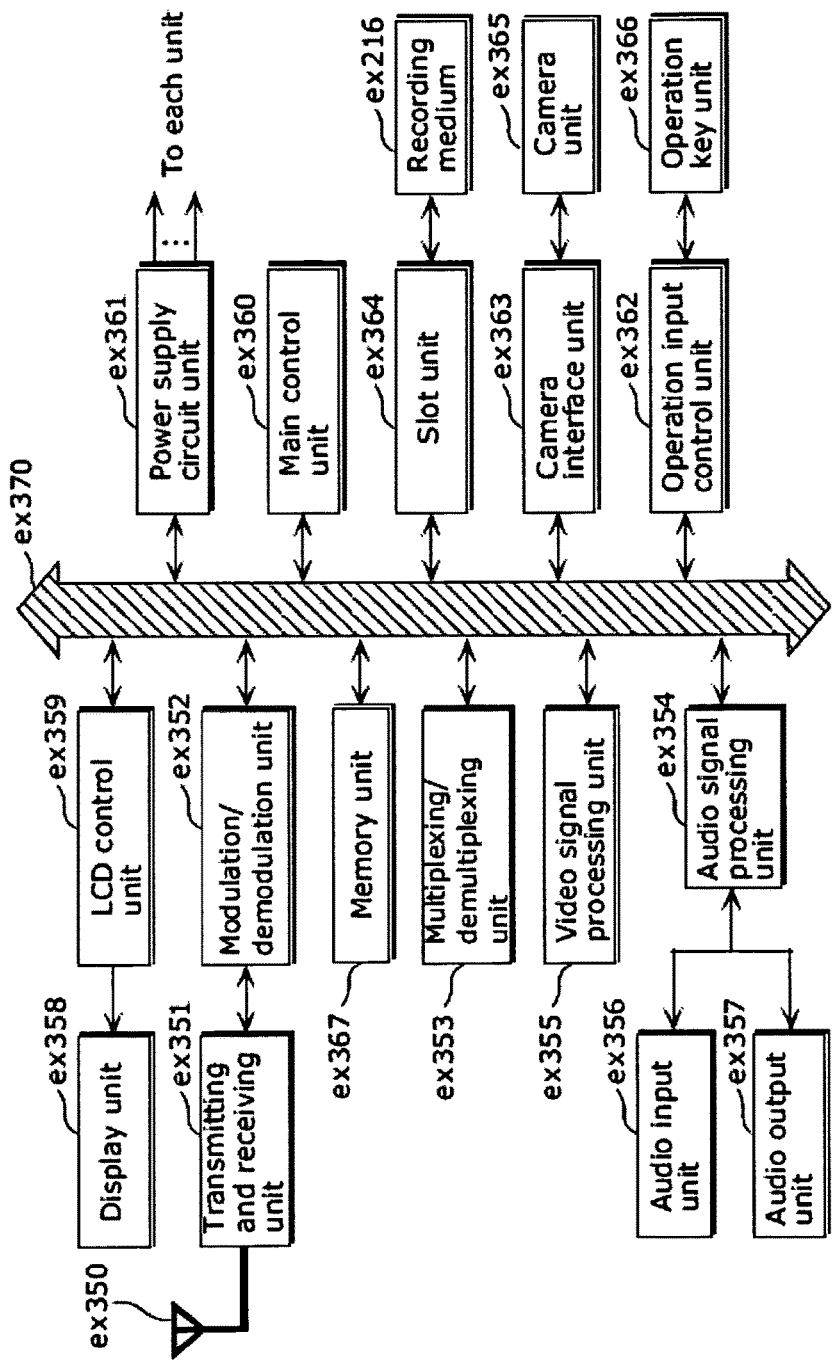
FIG. 37B is a block diagram showing an example of a configuration of a cellular phone.

Next, an example of a configuration of the cellular phone ex114 will be described with reference to FIG. 37B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment B

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 38 illustrates a structure of the multiplexed data. As illustrated in FIG. 38, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 39:
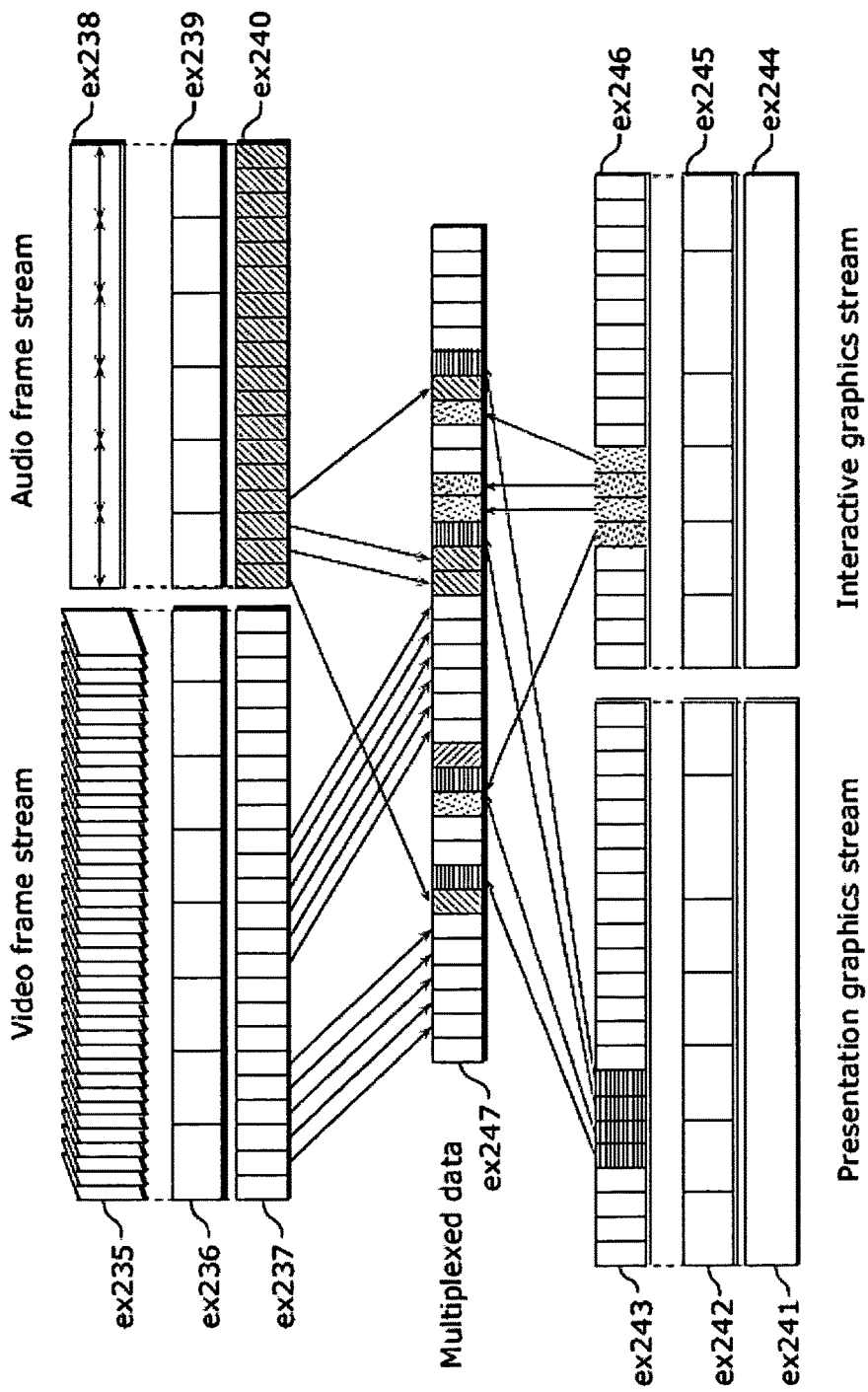
FIG. 39 schematically shows how each stream is multiplexed in multiplexed data.

FIG. 39 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 40:
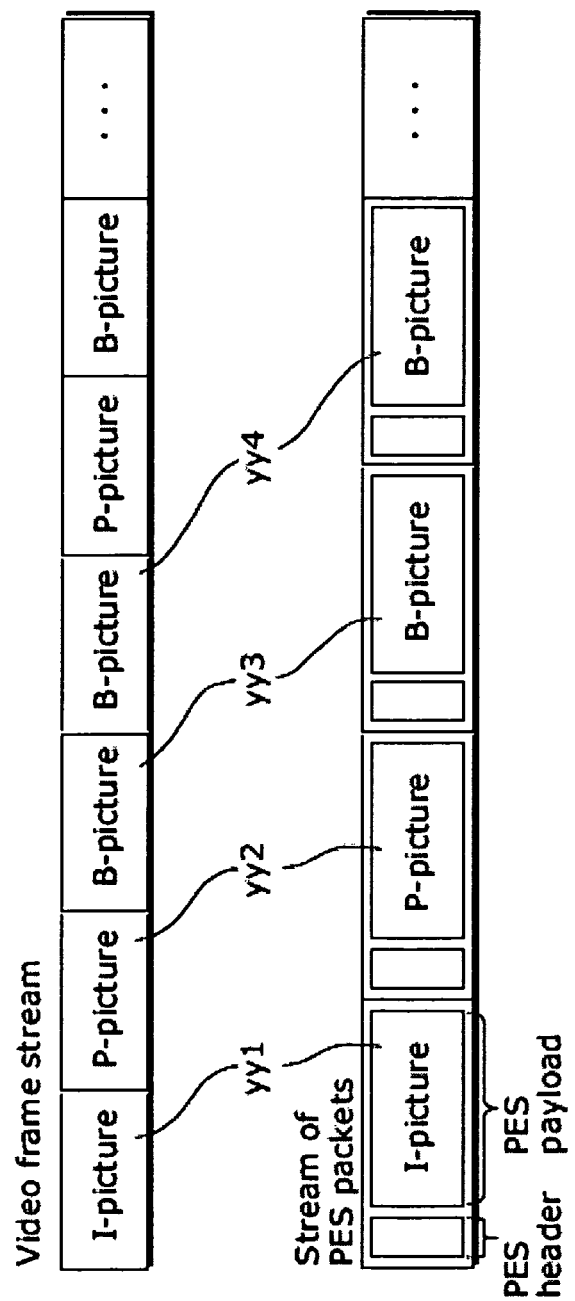
FIG. 40 shows how a video stream is stored in a stream of PES packets in more detail.

FIG. 40 illustrates how a video stream is stored in a stream of PES packets in more detail. The first bar in FIG. 40 shows a video frame stream in a video stream. The second bar shows the stream of PES packets. As indicated by arrows denoted as yy1, yy2, yy3, and yy4 in FIG. 40, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 41:
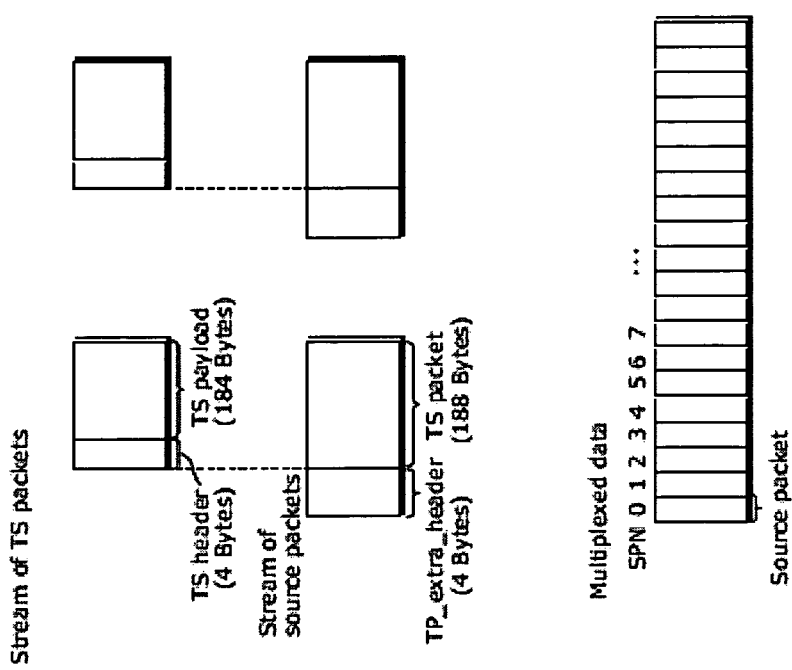
FIG. 41 shows a structure of TS packets and source packets in the multiplexed data.

FIG. 41 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 41. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 42:
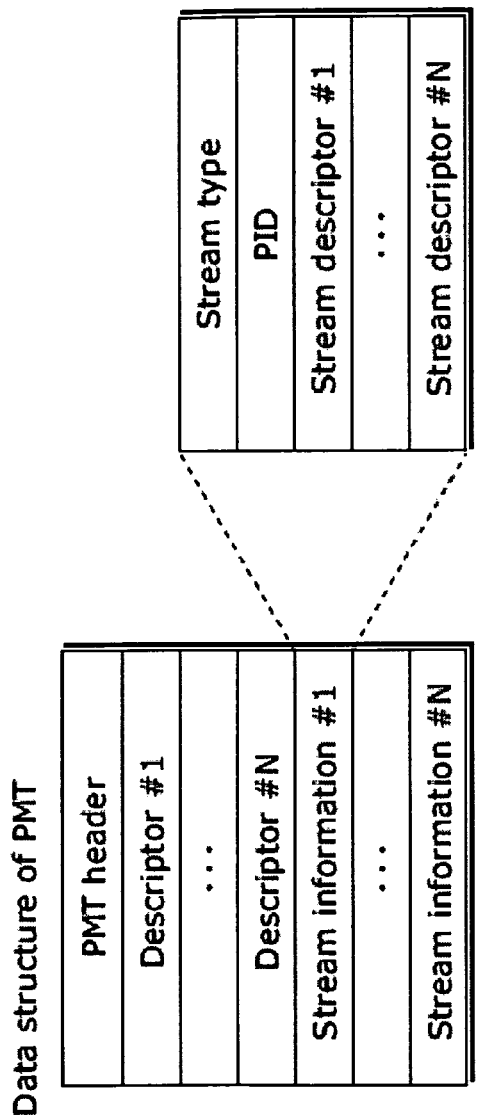
FIG. 42 shows a data structure of a PMT.

FIG. 42 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 43:
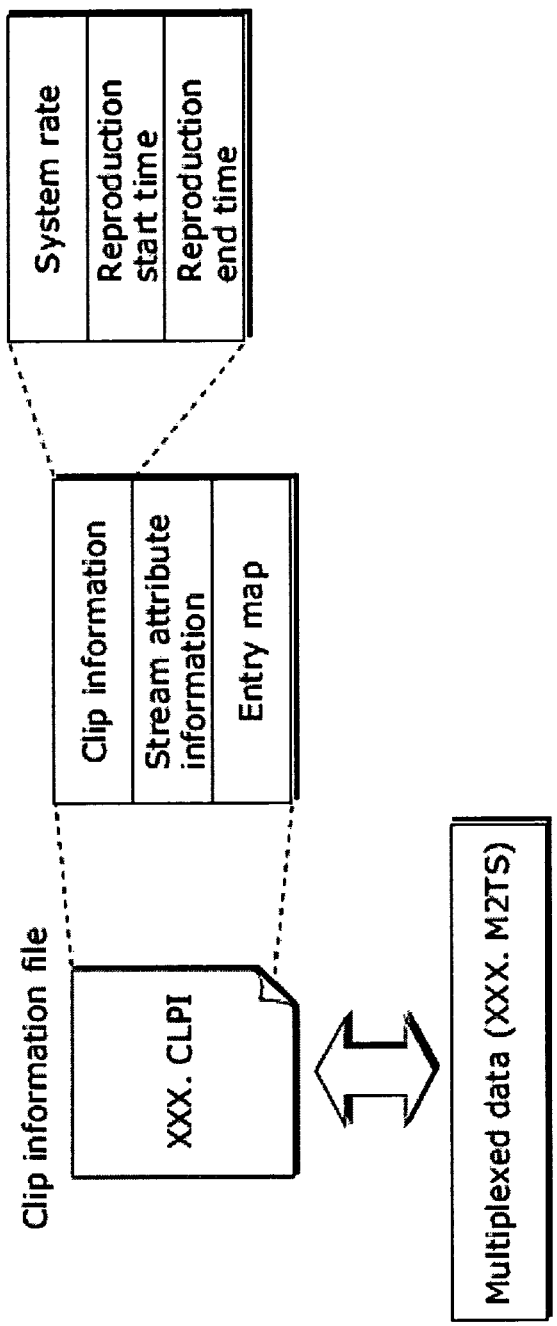
FIG. 43 shows an internal structure of multiplexed data information.

Each of the multiplexed data information files is management information of the multiplexed data as shown in FIG. 43. The multiplexed data information files are in one to one correspondence with the multiplexed data, and each of the files includes multiplexed data information, stream attribute information, and an entry map.

As illustrated in FIG. 43, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 44:
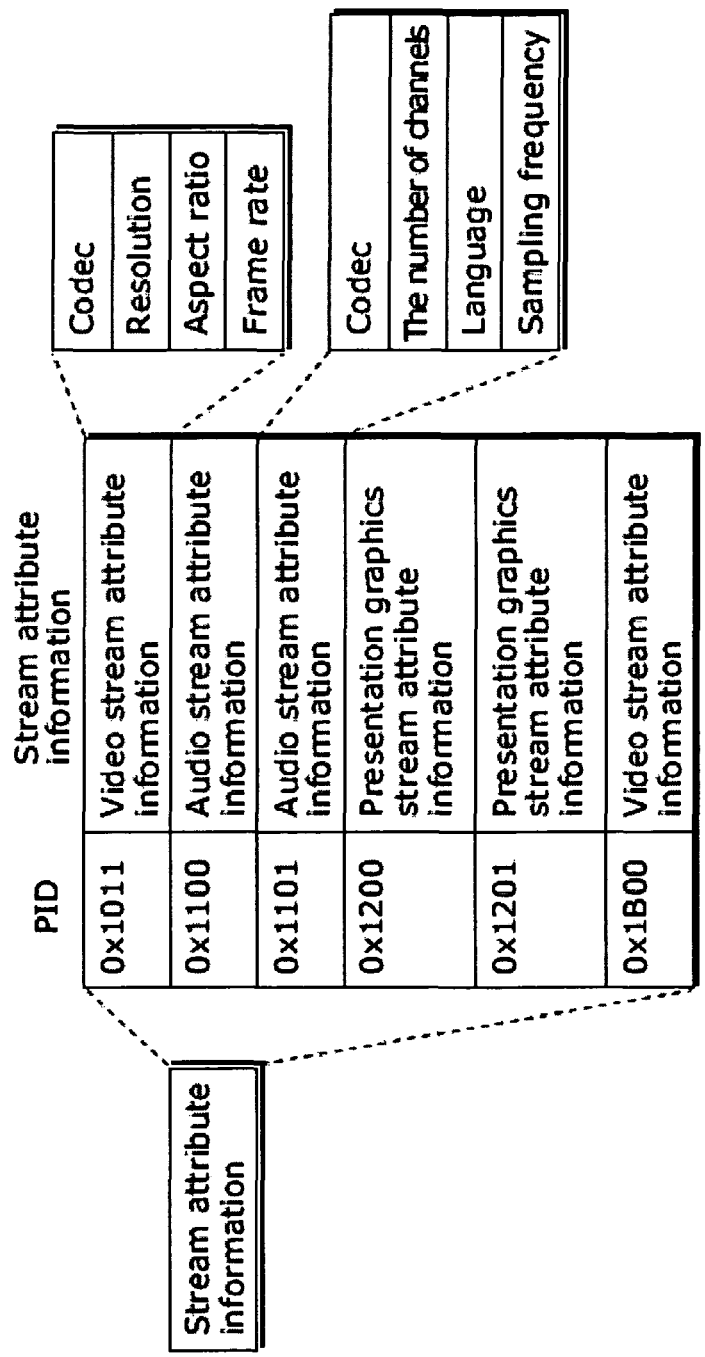
FIG. 44 shows an internal structure of stream attribute information.

As shown in FIG. 44, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 45:
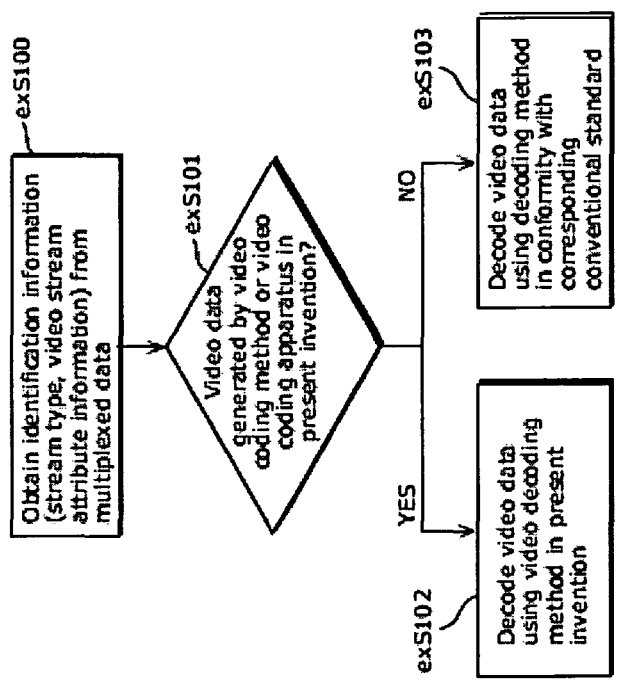
FIG. 45 shows steps for identifying video data.

Furthermore, FIG. 45 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment C

Figure 46:
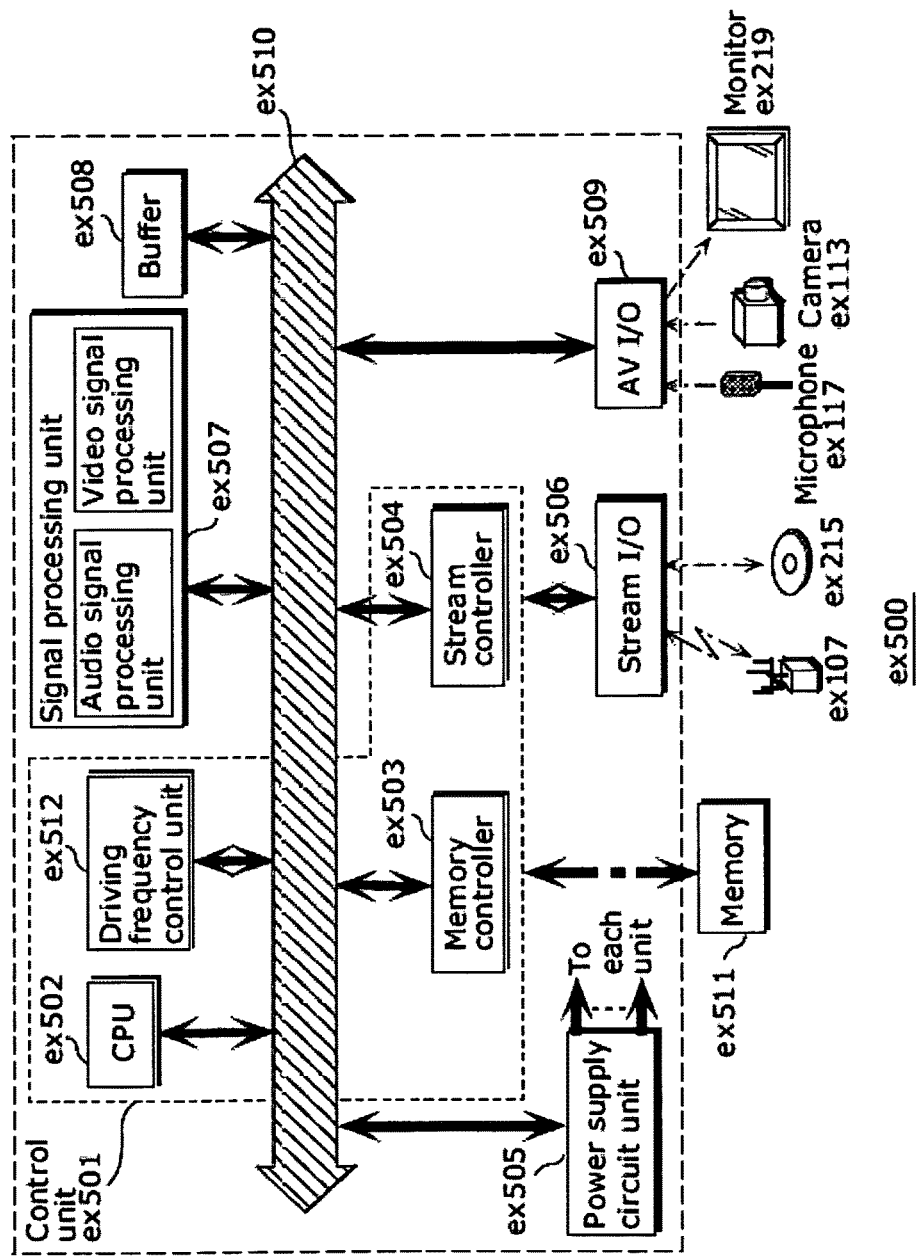
FIG. 46 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 46 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment D

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 47:
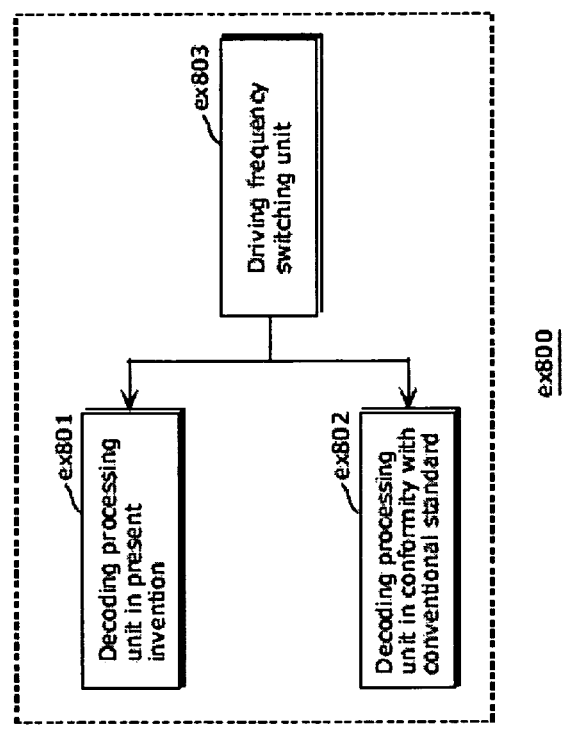
FIG. 47 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 47 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 46. Here, each of the decoding processing unit ex801 that executes the moving picture decoding method described in each of embodiments and the decoding processing unit ex802 that conforms to the conventional standard corresponds to the signal processing unit ex507 in FIG. 46. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 49. The driving frequency can be selected by storing the look-up table in the buffer ex508 and in an internal memory of an LSI, and with reference to the look-up table by the CPU ex502.

Figure 48:
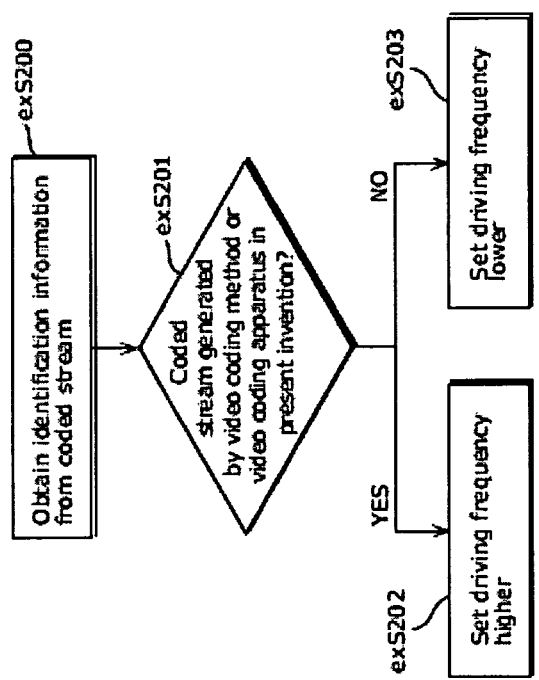
FIG. 48 shows steps for identifying video data and switching between driving frequencies.

FIG. 48 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment E

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 50A:
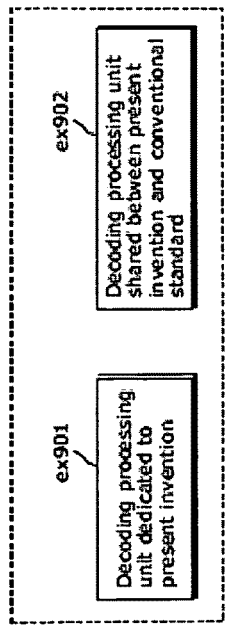
FIG. 50A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 50A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 50B:
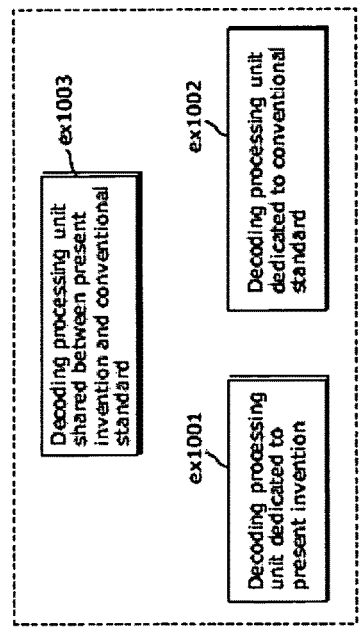
FIG. 50B is a diagram showing another example of a configuration for sharing a module of the signal processing unit.

Furthermore, ex1000 in FIG. 50B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

In summary, the present invention relates to a simplified pipeline for Sample Adaptive Offset (SAO) and Adaptive Loop Filtering (ALF) in the in-loop decoding of a video encoder and a video decoder. According to the present invention, filter parameter setting regions and filtering processing windows are aligned, to reduce the required amount of memory for parameter sets necessary for delayed filtering. This is preferably achieved by a displacement of the filter parameter setting regions with respect to LCU boundaries in at least one (preferably: vertical) or both vertical and horizontal directions.

The invention claimed is:

1. A method for processing an image signal including image data for an image that is composed of pixels and subdivided into a plurality of non-overlapping regions, wherein the processing includes at least one stage, the stage being Sample Adaptive Offset or Adaptive Loop Filtering, and wherein the method comprises, for the stage, the steps of:
   setting, for each of the regions, a set of processing parameters; and
   completely performing the processing of the stage within each of the regions based on the set of processing parameters for the respective region, before starting the processing of the stage for a next one of the regions,
   wherein the image is subdivided into the plurality of regions such that (i) region boundaries that are not outer boundaries of the image are shifted in at least one direction parallel to coding unit boundaries by a pre-determined number of pixels from the coding unit boundaries, (ii) each of the regions is a same size as that of a corresponding coding unit on which the processing of the stage within the region is completely performed, and (iii) each of the regions and the corresponding coding unit are in a same image.

2. The method according to claim 1, wherein the stage is Sample Adaptive Offset, and wherein setting the processing parameters includes setting, for each of the regions, a pixel classification rule.

3. The method according to claim 1, wherein the stage is Adaptive Loop Filtering, and wherein setting the processing parameters includes choosing, for each of the regions, a particular one out of a plurality of filters.

4. The method according to claim 1, wherein the at least one stage includes both the stages of Sample Adaptive Offset and Adaptive Loop Filtering, the stage of Adaptive Loop Filtering to be performed subsequent to the stage of Sample Adaptive Offset, wherein the setting step and the step of completely performing the processing are performed for both the stages of Sample Adaptive Offset and Adaptive Loop Filtering.

5. The method according to claim 4, wherein the subdivision of the image into non-overlapping regions is the same for both the stages of Sample Adaptive Offset and Adaptive Loop Filtering.

6. The method according to claim 4, wherein the subdivision of the image into non-overlapping regions is different for the stages of Sample Adaptive Offset and Adaptive Loop Filtering.

7. The method according to claim 1, further including a stage of deblocking, the deblocking to be performed before the stage of Sample Adaptive Offset or Adaptive Loop Filtering.

8. The method according to claim 1, wherein the coding units are largest coding units.

9. The method according to claim 1, wherein the number of pixels defining a magnitude of the shift is predefined according to a codec scheme.

10. The method according to claim 1, wherein the number of pixels defining a magnitude of the shift is transmitted in a bit stream including the image signal.

11. The method according to claim 1, wherein the number of pixels defining a magnitude of the shift is set such that the processing of the stage does not require pixels not yet processed by a previous stage.

12. A method for encoding an image including a plurality of pixels, the method comprising the steps of:
   compressing and reconstructing image data of the image, and
   processing the image signal, including the reconstructed image data, according to the method of claim 1.

13. A method for decoding a coded image including a plurality of pixels, the method comprising the steps of:
   reconstructing image data of the image, and
   processing the image signal, including the reconstructed image data, according to the method of claim 1.

14. A computer program product comprising a non-transitory computer-readable medium having a computer-readable program code embodied thereon, the program code being adapted to carry out the method according to claim 1.

15. An apparatus for processing an image signal including image data for an image that is composed of pixels and subdivided into a plurality of non-overlapping regions, wherein the processing includes at least one stage, the stage being Sample Adaptive Offset or Adaptive Loop Filtering, and wherein the apparatus comprises:
   a processor; and
   a non-transitory memory having stored therein executable instructions, which when executed, cause the processor to perform:
      setting, for each of the regions, a set of processing parameters for the stage; and
      completely performing the processing of the stage within each of the regions based on the set of processing parameters for the respective region, before starting the processing of the stage for a next one of the regions,
   wherein the image is subdivided into the plurality of regions such that (i) region boundaries that are not outer boundaries of the image are shifted in at least one direction parallel to coding unit boundaries by a pre-determined number of pixels from the coding unit boundaries, (ii) each of the regions is a same size as that of a corresponding coding unit on which the processing of the stage within the region is completely performed, and (iii) each of the regions and the corresponding coding unit are in a same image.

16. The apparatus according to claim 15, wherein the stage is Sample Adaptive Offset, and wherein setting the processing parameters includes setting, for each of the regions, a pixel classification rule.

17. The apparatus according to claim 15, wherein the stage is Adaptive Loop Filtering, and wherein setting the processing parameters includes choosing, for each of the regions, a particular one out of a plurality of filters.

18. The apparatus according to claim 15,
wherein the at least one stage includes both the stages of Sample Adaptive Offset and Adaptive Loop Filtering, the stage of Adaptive Loop Filtering to be performed subsequent to the stage of Sample Adaptive Offset, and for each of the stages of Sample Adaptive Offset and Adaptive Loop Filtering, the processor sets, for each of the regions, the set of processing parameters, and the processor completely performs the processing of the stage within each of the regions based on the set of processing parameters for the respective region, before starting the processing of the stage for a next one of the regions.

19. The apparatus according to claim 18, wherein the subdivision of the image into non-overlapping regions is the same for both the stages of Sample Adaptive Offset and Adaptive Loop Filtering.

20. The apparatus according to claim 18, wherein the subdivision of the image into non-overlapping regions is different for the stages of Sample Adaptive Offset and Adaptive Loop Filtering.

21. The apparatus according to claim 15, wherein the processor further performs a stage of deblocking, the deblocking being performed before the stage of Sample Adaptive Offset or Adaptive Loop Filtering.

22. The apparatus according to claim 15, wherein the coding units are largest coding units.

23. The apparatus according to claim 15, wherein the number of pixels defining a magnitude of the shift is predefined according to a codec scheme.

24. The apparatus according to claim 15, wherein the number of pixels defining a magnitude of the shift is transmitted in a bit stream including the image signal.

25. The apparatus according to claim 15, wherein the number of pixels defining a magnitude of the shift is set such that the processing of the processing stage does not require pixels not yet processed by a previous processing stage.

26. An apparatus for encoding an image including a plurality of pixels, the apparatus comprising:
an encoder with a decoder for compressing and reconstructing image data of the image, and
the apparatus according to claim 15 for processing the image signal including the reconstructed image data.

27. An apparatus for decoding an image including a plurality of pixels, the apparatus comprising:
a decoder for reconstructing image data of the image, and
the apparatus according to claim 15 for processing the image signal including the reconstructed image data.

* * * * *

UNITED STATES PATENT AND TRADEMARK OFFICE
CERTIFICATE OF CORRECTION

PATENT NO. : 10,382,753 B2  
APPLICATION NO. : 14/126588  
DATED : August 13, 2019  
INVENTOR(S) : Semih Esenlik Page 1 of 1

It is certified that error appears in the above-identified patent and that said Letters Patent is hereby corrected as shown below:

On the Title Page

In Item (75), Line 2, "Narroschke, Schaafheim (DE)" should read --Narroschke, Schaafheim (DE); Thomas Wedi, The Hague (NL)--.

Signed and Sealed this  
Twenty-sixth Day of November, 2019

Andrei Iancu  
*Director of the United States Patent and Trademark Office*